US008460091B2

(12) United States Patent
Wells et al.

(10) Patent No.: US 8,460,091 B2

(45) Date of Patent: Jun. 11, 2013

(54) REMOTE POWER RESET FEATURE ON A GAMING MACHINE

(75) Inventors: William R. Wells, Carson City, NV (US); Ali Saffari, Reno, NV (US)

(73) Assignee: Leap Forward Gaming, Reno, NV (US)

(*) Notice: Subject to any disclaimer, the term of this patent is extended or adjusted under 35 U.S.C. 154(b) by 62 days.

(21) Appl. No.: 13/086,218

(22) Filed: Apr. 13, 2011

(65) Prior Publication Data

US 2011/0195792 A1 Aug. 11, 2011

Related U.S. Application Data

(63) Continuation-in-part of application No. 12/943,789, filed on Nov. 10, 2010, now Pat. No. 8,088,014, and a continuation-in-part of application No. 12/943,792, filed on Nov. 10, 2010, now Pat. No. 8,083,592, and a continuation-in-part of application No. 12/943,797, filed on Nov. 10, 2010, now Pat. No. 8,241,119, and a continuation-in-part of application No. 12/943,798, filed on Nov. 10, 2010, now Pat. No. 8,336,697, and a continuation-in-part of application No. 12/943,802, filed on Nov. 10, 2010, now abandoned.

(60) Provisional application No. 61/303,106, filed on Feb. 10, 2010.

(51) Int. Cl.

*G06F 17/00* (2006.01)

*G06F 1/00* (2006.01)

(52) U.S. Cl.

USPC .............................. 463/24; 713/300; 713/310

(58) Field of Classification Search

USPC ..................................... 463/24; 713/300, 310

See application file for complete search history.

(56) References Cited

U.S. PATENT DOCUMENTS

| | | | |
|---|---|---|---|
| 5,091,713 | A | 2/1992 | Horne et al. |
| 5,531,309 | A | 7/1996 | Kloss et al. |

(Continued)

FOREIGN PATENT DOCUMENTS

| | | |
|---|---|---|
| EP | 0 744 786 | 11/1996 |
| EP | 1 074 955 | 2/2001 |

(Continued)

OTHER PUBLICATIONS

U.S. Office Action mailed Jun. 15, 2011, from U.S. Appl. No. 12/943,792.

(Continued)

*Primary Examiner* — Dmitry Suhol

*Assistant Examiner* — Carl V Larsen

(74) *Attorney, Agent, or Firm* — Kwan & Olynick LLP

(57) ABSTRACT

A gaming device for a gaming machine is described. The gaming device can be configured to implement commands related to performing maintenance operations on the gaming machine. The commands can be initiated from a remote device, such as mobile device, separate from the gaming machine and the gaming device. In one embodiment, the gaming peripheral can be coupled to a power switching device on the gaming machine. A number of devices on the gaming machine, such as game controller, can be configured to receive power that is routed through the power switching device. The gaming device can be configured to receive a command from a remote device to cycle power on the gaming machine using the power switching device. In one example, the power can be cycled on the gaming machine to clear an error condition.

20 Claims, 8 Drawing Sheets

U.S. PATENT DOCUMENTS

| | | | | |
|---|---|---|---|---|
| 5,605,506 | A | 2/1997 | Hoorn et al. | |
| 5,611,730 | A | 3/1997 | Weiss | |
| 5,769,269 | A | 6/1998 | Peters | |
| 5,844,808 | A | 12/1998 | Konsmo et al. | |
| 5,908,354 | A | 6/1999 | Okuniewicz | |
| 6,146,276 | A | 11/2000 | Okuniewicz | |
| 6,249,885 | B1 | 6/2001 | Johnson et al. | |
| 6,286,756 | B1 | 9/2001 | Stinson et al. | |
| 6,354,749 | B1 | 3/2002 | Pfaffenberger, II | |
| 6,379,246 | B1 | 4/2002 | Dabrowski | |
| 6,533,659 | B2 | 3/2003 | Seymour et al. | |
| 6,548,967 | B1 | 4/2003 | Dowling et al. | |
| 6,638,170 | B1 | 10/2003 | Crumby | |
| 6,846,238 | B2 | 1/2005 | Wells | |
| 6,854,645 | B1 | 2/2005 | Somers, Jr. et al. | |
| 6,897,624 | B2 | 5/2005 | Lys et al. | |
| 6,924,903 | B2 | 8/2005 | Brooks et al. | |
| 6,997,803 | B2 | 2/2006 | LeMay et al. | |
| 7,014,563 | B2 | 3/2006 | Stephan et al. | |
| 7,051,221 | B2 * | 5/2006 | Clabes et al. | 713/320 |
| 7,099,035 | B2 | 8/2006 | Brooks et al. | |
| D529,966 | S | 10/2006 | LeSourd et al. | |
| D536,389 | S | 2/2007 | LeSourd et al. | |
| D536,742 | S | 2/2007 | Kaminkow et al. | |
| 7,178,941 | B2 | 2/2007 | Roberge et al. | |
| 7,202,613 | B2 | 4/2007 | Morgan et al. | |
| 7,213,812 | B2 | 5/2007 | Schubert et al. | |
| 7,270,605 | B2 | 9/2007 | Russell et al. | |
| 7,290,072 | B2 | 10/2007 | Quraishi et al. | |
| 7,309,965 | B2 | 12/2007 | Dowling et al. | |
| 7,311,598 | B2 | 12/2007 | Kaminkow et al. | |
| 7,311,604 | B2 | 12/2007 | Kaminkow et al. | |
| 7,385,359 | B2 | 6/2008 | Dowling et al. | |
| 7,390,257 | B2 | 6/2008 | Paulsen et al. | |
| 7,442,125 | B2 | 10/2008 | Paulsen et al. | |
| 7,529,868 | B2 | 5/2009 | Brooks et al. | |
| 7,550,931 | B2 | 6/2009 | Lys et al. | |
| 7,641,554 | B2 | 1/2010 | Paulsen et al. | |
| 7,642,730 | B2 | 1/2010 | Dowling et al. | |
| 7,646,029 | B2 | 1/2010 | Mueller et al. | |
| 7,689,167 | B2 | 3/2010 | Sengupta et al. | |
| 7,704,147 | B2 | 4/2010 | Quraishi et al. | |
| 7,764,026 | B2 | 7/2010 | Dowling et al. | |
| 7,803,053 | B2 | 9/2010 | Atkinson | |
| 8,075,408 | B2 | 12/2011 | Hwang | |
| 8,083,592 | B2 | 12/2011 | Wells | |
| 8,088,014 | B2 | 1/2012 | Wells | |
| 2001/0036866 | A1 | 11/2001 | Stockdale et al. | |
| 2002/0016829 | A1 | 2/2002 | Defosse | |
| 2002/0115487 | A1 | 8/2002 | Wells | |
| 2002/0128932 | A1 | 9/2002 | Yung et al. | |
| 2002/0132663 | A1 | 9/2002 | Cumbers | |
| 2003/0054880 | A1 | 3/2003 | Lam et al. | |
| 2003/0074106 | A1 | 4/2003 | Butler | |
| 2003/0081824 | A1 | 5/2003 | Mennie et al. | |
| 2003/0109302 | A1 | 6/2003 | Rist | |
| 2003/0190958 | A1 | 10/2003 | Paulsen | |
| 2003/0195037 | A1 * | 10/2003 | Vuong et al. | 463/29 |
| 2004/0014526 | A1 | 1/2004 | Kulas | |
| 2004/0043814 | A1 | 3/2004 | Angell et al. | |
| 2004/0082385 | A1 | 4/2004 | Silva et al. | |
| 2004/0132532 | A1 | 7/2004 | Brosnan et al. | |
| 2004/0146975 | A1 | 7/2004 | Yaver et al. | |
| 2004/0153748 | A1 | 8/2004 | Fabrizi et al. | |
| 2004/0166917 | A1 | 8/2004 | Lam et al. | |
| 2004/0166932 | A1 | 8/2004 | Lam et al. | |
| 2004/0171423 | A1 | 9/2004 | Silva et al. | |
| 2004/0238319 | A1 | 12/2004 | Hand et al. | |
| 2004/0254006 | A1 | 12/2004 | Lam et al. | |
| 2004/0254013 | A1 | 12/2004 | Quraishi et al. | |
| 2005/0003890 | A1 | 1/2005 | Hedrick et al. | |
| 2005/0041161 | A1 | 2/2005 | Dowling et al. | |
| 2005/0043086 | A1 | 2/2005 | Schneider | |
| 2005/0061605 | A1 | 3/2005 | Bell et al. | |
| 2005/0099824 | A1 | 5/2005 | Dowling et al. | |
| 2005/0153776 | A1 | 7/2005 | LeMay et al. | |
| 2005/0159203 | A1 | 7/2005 | Bond et al. | |
| 2005/0216120 | A1 | 9/2005 | Rosenberg et al. | |
| 2005/0248299 | A1 | 11/2005 | Chemel et al. | |
| 2005/0261057 | A1 | 11/2005 | Bleich et al. | |
| 2005/0275626 | A1 | 12/2005 | Mueller et al. | |
| 2005/0277471 | A1 | 12/2005 | Russell et al. | |
| 2005/0282631 | A1 | 12/2005 | Bonney et al. | |
| 2006/0035707 | A1 | 2/2006 | Nguyen et al. | |
| 2006/0046819 | A1 | 3/2006 | Nguyen et al. | |
| 2006/0046849 | A1 | 3/2006 | Kovacs | |
| 2006/0063594 | A1 | 3/2006 | Benbrahim | |
| 2006/0073869 | A1 | 4/2006 | LeMay et al. | |
| 2006/0166741 | A1 | 7/2006 | Boyd et al. | |
| 2006/0178190 | A9 | 8/2006 | Okuniewicz | |
| 2006/0189391 | A1 | 8/2006 | Bird | |
| 2006/0217172 | A1 | 9/2006 | Roireau | |
| 2006/0219777 | A1 | 10/2006 | Arora et al. | |
| 2006/0221386 | A1 | 10/2006 | Brooks et al. | |
| 2006/0287095 | A1 | 12/2006 | Mattice et al. | |
| 2007/0010318 | A1 | 1/2007 | Rigsby et al. | |
| 2007/0021215 | A1 | 1/2007 | Russell et al. | |
| 2007/0050443 | A1 * | 3/2007 | Ewing et al. | 709/200 |
| 2007/0111796 | A1 | 5/2007 | Giaimo, III et al. | |
| 2007/0119681 | A1 | 5/2007 | Blake et al. | |
| 2007/0123335 | A1 | 5/2007 | Okada | |
| 2007/0189026 | A1 | 8/2007 | Chemel et al. | |
| 2007/0243925 | A1 | 10/2007 | LeMay et al. | |
| 2007/0243934 | A1 | 10/2007 | Little et al. | |
| 2008/0020838 | A1 | 1/2008 | Slattery | |
| 2008/0039972 | A1 | 2/2008 | Walker et al. | |
| 2008/0045345 | A1 | 2/2008 | Bird | |
| 2008/0076506 | A1 | 3/2008 | Nguyen et al. | |
| 2008/0113767 | A1 | 5/2008 | Nguyen et al. | |
| 2008/0194329 | A1 | 8/2008 | Page et al. | |
| 2008/0215391 | A1 | 9/2008 | Dowling et al. | |
| 2008/0242408 | A1 | 10/2008 | Hwang | |
| 2008/0274795 | A1 * | 11/2008 | Carpenter et al. | 463/25 |
| 2008/0293494 | A1 | 11/2008 | Adiraju et al. | |
| 2008/0300046 | A1 | 12/2008 | Gagner et al. | |
| 2008/0313636 | A1 | 12/2008 | Goldstein et al. | |
| 2009/0029770 | A1 | 1/2009 | Nagano | |
| 2009/0069094 | A1 | 3/2009 | Brosnan et al. | |
| 2009/0082079 | A1 | 3/2009 | Kuhn et al. | |
| 2009/0094081 | A1 | 4/2009 | Wittern et al. | |
| 2009/0137318 | A1 | 5/2009 | Russo et al. | |
| 2009/0138638 | A1 | 5/2009 | Russo et al. | |
| 2009/0172980 | A1 | 7/2009 | Heather et al. | |
| 2009/0174346 | A1 | 7/2009 | Hwang et al. | |
| 2009/0197673 | A1 | 8/2009 | Bone et al. | |
| 2009/0233705 | A1 | 9/2009 | Lemay et al. | |
| 2009/0247281 | A1 | 10/2009 | Voutes | |
| 2009/0270159 | A1 | 10/2009 | Kato et al. | |
| 2009/0270167 | A1 | 10/2009 | Ajiro et al. | |
| 2009/0276640 | A1 * | 11/2009 | Wu | 713/300 |
| 2009/0294243 | A1 | 12/2009 | Charych et al. | |
| 2009/0307505 | A1 * | 12/2009 | Robertson et al. | 713/300 |
| 2009/0325686 | A1 | 12/2009 | Davis et al. | |
| 2010/0016073 | A1 | 1/2010 | Goldstein et al. | |
| 2010/0020546 | A1 | 1/2010 | Kukita | |
| 2010/0105454 | A1 | 4/2010 | Weber et al. | |
| 2010/0120518 | A1 | 5/2010 | Borissov et al. | |
| 2010/0124990 | A1 | 5/2010 | Crowder | |
| 2010/0127634 | A1 | 5/2010 | Dowling et al. | |
| 2010/0130278 | A1 | 5/2010 | Shimabukuro et al. | |
| 2010/0197404 | A1 | 8/2010 | Lum et al. | |
| 2010/0203961 | A1 | 8/2010 | Burke et al. | |
| 2010/0255902 | A1 | 10/2010 | Goldstein et al. | |
| 2010/0285866 | A1 * | 11/2010 | Bleich et al. | 463/24 |
| 2011/0032070 | A1 * | 2/2011 | Bleile | 340/3.51 |
| 2012/0122584 | A1 | 5/2012 | Nguyen | |
| 2012/0142403 | A1 | 6/2012 | Prather et al. | |

FOREIGN PATENT DOCUMENTS

| | | |
|---|---|---|
| EP | 2 009 602 | 12/2008 |
| JP | 56168275 | 12/1981 |
| WO | WO 97/27576 | 7/1997 |
| WO | WO 2007/146316 | 12/2007 |

OTHER PUBLICATIONS

U.S. Office Action mailed Jul. 28, 2011, from U.S. Appl. No. 12/943,802.

International Search Report dated Jun. 22, 2011 from International Application No. PCT/US2010/059551.
Written Opinion dated Jun. 22, 2011 from International Application No. PCT/US2010/059551.
U.S. Office Action mailed May 23, 2011, from U.S. Appl. No. 12/943,789.
U.S. Office Action mailed Sep. 6, 2011, from U.S. Appl. No. 12/943,798.
U.S. Final Office Action mailed Oct. 26, 2011, from U.S. Appl. No. 12/943,802.
Notice of Allowance mailed Oct. 18, 2011, from U.S. Appl. No. 12/943,792.
Notice of Allowance mailed Oct. 17, 2011, from U.S. Appl. No. 12/943,789.
U.S. Final Office Action mailed Jan. 31, 2012, from U.S. Appl. No. 12/943,798.
U.S. Office Action dated Feb. 1, 2012, from U.S. Appl. No. 12/943,797.
U.S. Office Action dated May 21, 2012 from U.S. Appl. No. 13/294,064.
U.S. Office Action dated Jun. 7, 2012 from U.S. Appl. No. 12/943,798.
U.S. Office Action dated Jun. 12, 2012 from U.S. Appl. No. 13/300,344.
Notice of Allowance dated Sep. 10, 2012 from U.S. Appl. No. 13/294,064.

* cited by examiner

REMOTE POWER RESET FEATURE ON A GAMING MACHINE

CROSS REFERENCE TO RELATED APPLICATIONS

This application claims priority under 35 U.S.C. §120 and is continuation-in-part of the following five U.S. patent applications, 1) U.S. patent application Ser. No. 12/943,789, titled, "Gaming Device and Method for Wireless Gaming System Providing Non-Intrusive Processes," by Wells, filed Nov. 10, 2010 now U.S. Pat. No. 8,088,014;

2) U.S. patent application Ser. No. 12/943,792, titled, "Apparatus and Method for Retrofitting Candle Devices on a Gaming Machine," by Wells, filed Nov. 10, 2010 now U.S. Pat. No. 8,083,592;

3) U.S. patent application Ser. No. 12/943,797, titled, "Candle Devices for Gaming Machines," by Wells, filed Nov. 10, 2010 now U.S. Pat. No. 8,241,119;

4) U.S. patent application Ser. No. 12/943,798, titled, "Device Health Monitoring for Gaming Machines," by Wells, filed Nov. 10, 2010 now U.S. Pat. No. 8,336,697; and 5) U.S. patent application Ser. No. 12/943,802, titled, "Device Monitoring and Wireless Communications for Vending Machines," by Wells, filed Nov. 10, 2010 now abandoned; where each of the five applications above claim priority under 35 U.S.C. §119(e) to U.S. Provisional Patent Application Ser. No. 61/303,106 entitled "Gaming Device and Method for Wireless Gaming System Providing Non-Intrusive Processes" by Wells, filed Feb. 10, 2010 and where the five U.S. Patent Applications and the single U.S. Provisional Patent Application are each incorporated by reference in their entirety and for all purposes.

BACKGROUND

1. Field of the Invention

The invention relates to gaming devices that provide communication capabilities and enhanced gaming functions on a gaming machine.

2. Description of the Related Art

Casinos derive most of their revenue from gaming machines such as mechanical and video slots and table games such as poker and twenty-one. One important factor to casino operators is related to providing these games are minimizing operating costs. Minimizing operating costs involves factors, such as minimizing the labor and maintenance costs associated with providing a game at a gaming machine or at a table.

Maintenance operations for gaming machines deployed in the field, such as on the floor of a casino, within a bar or in a store, can be costly from lost revenue and labor perspectives. Revenues are lost while a gaming machine is not available for game play. The labor costs result from the costs of maintaining a staff to address on-going maintenance issues.

One reason maintenance operations are costly is that access to the interior of a gaming machine is very restricted. For security and regulatory purposes, gaming machines include a number of locked enclosures that are monitored by an internal security system. The locked enclosures and security system help to prevent unauthorized access to resources within the gaming machine that may be targets of theft or tampering, such as deposited money or gaming software. To address a maintenance issue that requires access to interior portions of the gaming machine, often two or more keys carried by separate individuals are required. During the performance of the maintenance operation in the interior, one individual not performing the maintenance may be required to watch the other individual performing the maintenance operation.

Thus, in view of the above, apparatus and method are desired that reduce the cost, time and effort associated with performing maintenance operations within an interior of a gaming machine.

SUMMARY

Broadly speaking, the embodiments disclosed herein describe relate to providing enhanced gaming functionality to wagered-based gaming devices, such as but not limited to mechanical slot reel or video slot machines. In particular, the embodiments can be used on gaming devices that execute regulated gaming software to control a play of a wager-based game on the gaming device. Method and apparatus described herein can be used to implement maintenance related commands on the gaming machine, such as a command to cycle power on the gaming machine. In particular embodiments, the method and apparatus may allow certain commands to be implemented without accessing an interior of the gaming machine.

One aspect related to a gaming system. The gaming system can include a) a power switching device configured to receive AC power and to output AC power and b) a gaming platform enhancement module (GPEM). The power switching device having 1) a switch configured to change positions such that received AC power is transmitted or blocked from being output and 2) control circuitry for receiving a control signal to change a position of the switch. The GPEM having a first communication interface for receiving information from a game controller on a gaming machine for providing a wager-based game; a second communication interface for wirelessly communicating with one or remote devices; a third communication interface for sending the control signal to change a position of the switch via the one or more control inputs; a power source that is not switched off by the power switching device and a controller, including a processor and a memory. In one embodiment, the controller can be configured to 1) receive information related to a status of the gaming machine via the first communication interface, 2) wirelessly communicate with the one or more remote devices via the second communication interface and 3) send the control signal to the power switching device via the third communication interface to change the position of switch such that power is interrupted to one or more devices on the gaming machine.

In particular embodiments, the switch is controlled using a DC control signal. The power switching device can include an opti-isolator circuit disposed between the AC circuitry associated with the switch and the switch control circuitry to prevent electric discharge from the power switching device from entering the GPEM. Further, the power switching device can include a plurality of switches wherein the position of each switch is separately controlled by the control circuitry. In one embodiment, the power switching device can be configured to provide switchable and non-switchable power.

In yet other embodiments, the controller can be further designed or configured to detect an error condition on the gaming machine wherein the control signal is sent to the power switching device to interrupt power to clear the error condition. In addition, the controller can be further configured to request an authorization from a remote device prior to sending the control signal to the power switching device to interrupt power. Also, the controller can be further designed or configured to receive a command from a remote device to generate the control signal to the power switching device to interrupt power.

Another aspect relates to a method in a gaming system including a power switching device communicatively coupled to a Gaming Platform Enhancement Module (GPEM). Power can be supplied to one or more gaming devices on a gaming machine via the power switching device. Further, the power switching can be used to reset power to the entire gaming machine including the game controller. The method can be generally characterized as receiving in the GPEM a command from a remote device to interrupt power to one or more gaming devices on the gaming machine; determining in the GPEM whether the gaming machine, which provides a wager-based game, is in a state that allows a power interruption; and sending from the GPEM a control signal to the power switching device wherein the control signal is for changing a switch position in the power switching device such that the power is interrupted to the one or more gaming devices. The power can be interrupted to the one or more gaming devices without opening a cabinet of the gaming machine in which the game controller is disposed.

Another aspect relates to a method in a gaming system including a power switching device communicatively coupled to a Gaming Platform Enhancement Module (GPEM). The power switching device can supply power to one or more gaming devices on a gaming machine. The method can be generally characterized as, determining in the GPEM that an error condition has occurred on the gaming machine; determining in the GPEM that cycling power on the gaming machine can clear the error condition; determining in the GPEM whether the gaming machine, which is configured to provide a wager-based game, is in a state that allows for power cycling; and sending from the GPEM a control signal to the power switching device. The control signal can be for changing a switch position in the power switching device such that the power is cycled on the gaming machine without opening a cabinet of the gaming machine in which the game controller is disposed.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
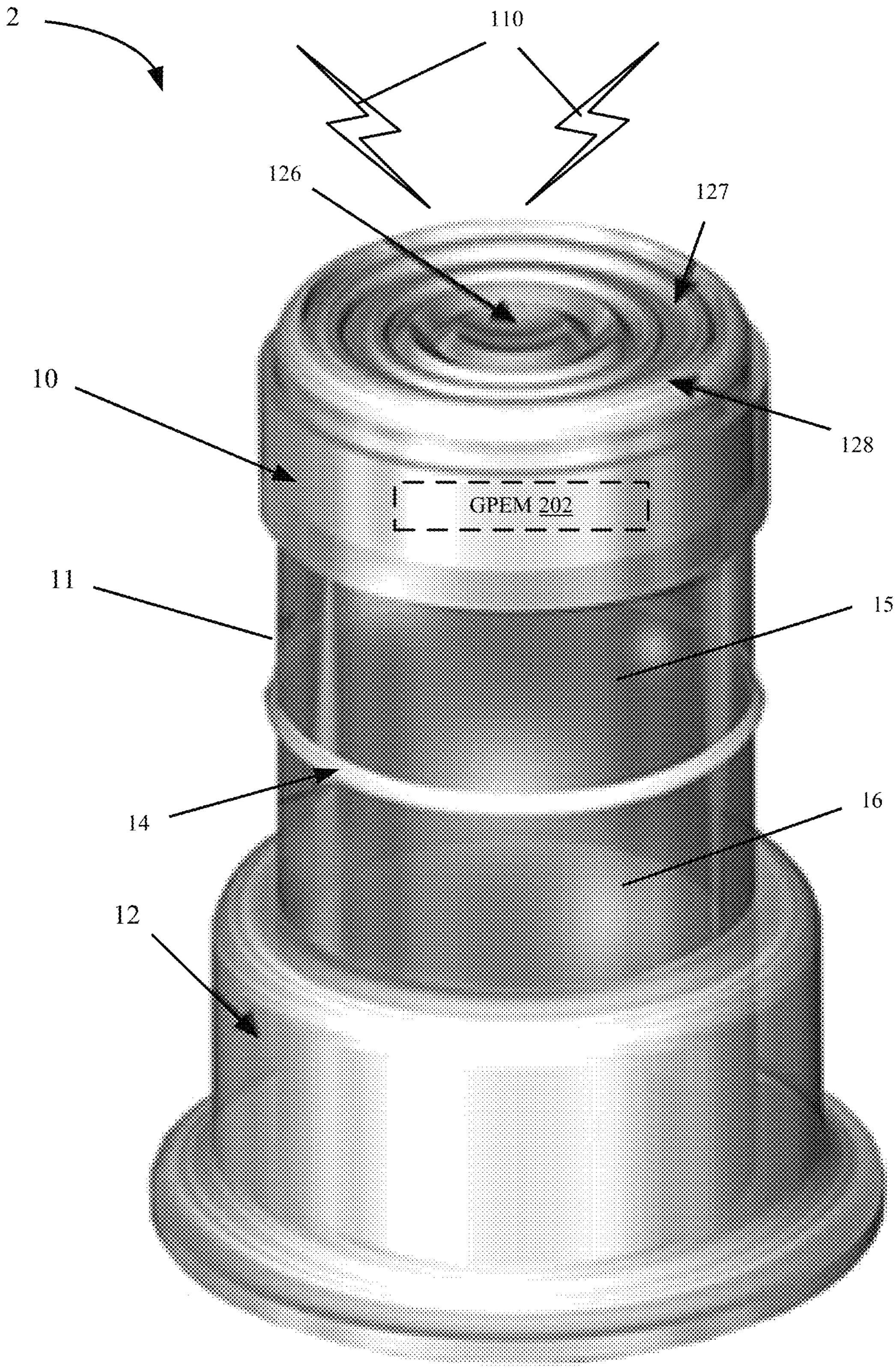
FIG. 1 is a perspective drawing of a system including a lighting device in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Typically, electronic gaming machines can be provided with a game controller and a number of peripheral devices coupled to the game controller, such as monitors, printers, bill/ticket acceptors, lights and bonus mechanisms. The game controller can be configured to control the play of a wager-based game on the gaming machine including determining game outcomes using a random number generator and interacting with the peripheral devices to present the determined game outcome to a user of the gaming machine. The interactions between the game controller and the peripheral devices can involve sending commands and/or data to the peripheral devices and receiving status information from the peripheral device.

The game controller and the peripheral devices can each include separate processors and memories of varying degrees of complexity and capabilities. For instance, a game controller can include a processor and memory architecture with capabilities of a personal computer while a lighting device can include a simple controller with very limited capabilities. In between, devices, such as bill acceptors and printers can be quite sophisticated but still have less complexity and capability than a game controller. The game controller and the separate controllers on each of the peripheral devices on each of the devices can be configured to execute separate software and/or firmware distinct from one another.

Like most electronic devices, during operation, the game controller and the controllers on the peripherals can generate error conditions that can cause the device to stop operating properly. Often, the cause of the error condition can be difficult to determine but can be cleared with a power-cycling or a restart of the device akin to cycling the power, or rebooting, on a personal computer. However, the process of performing a power-cycling on a gaming machine is more complicated than a user simply pressing a button or flipping switch like one does on a personal computer.

For security, safety and/or regulatory reasons, the power switching mechanisms on a gaming machine are not easily accessible. For instance, a power switching mechanism for the gaming machine can be located within one or more locked enclosures within an interior of the gaming machine that require multiple keys carried by separate individuals to access. Multiple individuals can be required to access the interior of the gaming machine because access to the interior of the gaming machine provides an opportunity for theft or tampering. Thus, implementing a power-cycle, i.e., simply flipping the switch on a gaming machine can involve multiple individuals that perform one or more tasks such as, 1) determining there is an error condition that can benefit from a power-cycling, 2) requesting a service visit for the gaming machine, 3) approving the service visit, 4) locating and directing the personnel needed to carry out the service visit, 5) carrying out the service visit, 6) determining whether the power-cycling was successful or whether additional service procedures are required and then 7) reporting and logging the power-cycling event. If the gaming machine is located in a remote location, such as a store or a bar that does not have on-site service personnel or a casino that does not have on-site personnel needed to fix a particular problem, then an additional task can be travelling to and from the location where the gaming machine is located. While this process is on-going, the gaming machine can be out of order and not generating revenue.

In view of the above, system and method are described to simplify the power-cycling process on an electronic gaming machine. The system can involve a gaming platform enhancement module (GPEM). The GPEM can be configured to implement a power-cycling event on a gaming machine. The power-cycling event can involve cutting power to the entire gaming machine, akin to flipping a main power switch within the gaming machine, or can involve cutting power to one or more portions of the gaming machine while power is maintained for other portions of the gaming machine Towards this end, the GPEM can be coupled to one or more power switching devices that are responsive to commands generated by the GPEM. The GPEM can include monitoring capabilities that allow error conditions that can benefit from a power-cycling event to be identified. In addition, the GPEM can include wireless and/or wired communication capabilities that allow the power-cycling event to be carried out by the GPEM alone or in conjunction with input from a remote device. Further, the GPEM can be configured to report power-cycling events to a remote device. An advantage of using the apparatus and method described herein is that a power-cycling event can be implemented without access to the interior of the gaming machine.

Embodiments of systems and methods including a GPEM configured to implement a power-cycling event on a gaming machine are described in more detail with respect to FIGS. 1-9. In particular, a system including a GPEM mounted to a lighting device is described with respect to FIGS. 1-3. Although, as is discussed in more detail below, the GPEM can also be implemented as a separate stand-alone module. Communication and power connections for a gaming machine coupled to a GPEM with power cycling capabilities are described with respect to FIGS. 4A-7. A network diagram including gaming machines equipped with GPEMs where the power-cycling on the gaming machines can be initiated from a mobile device are discussed in more detail with respect to FIG. 8. Finally, an interaction between a GPEM, a remote device and an intermediary server are described in more detail with respect to FIG. 9.

FIG. 1 is a perspective drawing of a system 2 in accordance with the described embodiments. A portion of system 2 can be used to provide lighting functions on a gaming machine, such as the lighting functions associated with a candle device on a gaming machine. Another portion of the system can be used to provide enhanced gaming machine functionality using a GPEM, such as a remote power reset function and wireless communication capabilities, which are discussed in more detail below.

The system 2 can include a housing 10 that fits over a clear shell 11. In one embodiment, the shell can 11 be cylindrical but other shapes are possible and the example of a cylinder is provided for illustrative purposes only. The shell 11 fits into a base 12. In a particular embodiment, the housing 10, shell 11 and base can be formed from a polycarbonate plastic. The housing 10 and base 12 can be metalized to provide a metal sheen if desired. One or more divider rings, such as 14, can be placed over the cylindrical shell 11 to divide the shell into a number of stages, such as stages 15 and 16. Each of the stages 15 and 16 can include lighting elements that are separately controlled. In one embodiment, the lighting elements can be used to provide candle functions. The base 12 can include a mounting plate (not shown) that allows the system 2 to be attached to a surface, such as a surface of a gaming cabinet on a gaming machine. An aperture in the gaming cabinet can allow a wiring bundle, including power and/or data connections for the system 2, to be passed through an exterior surface of the gaming cabinet and into the base 12.

In particular embodiments, sound and wireless communication capabilities can be provided with system 2. In one embodiment, the housing 10 can include a top rim 128 where one or more speaker modules, such as speaker 126, and an antenna 127 can be disposed within the top rim 128. The antenna 127 can be used to transmit and receive wireless signals 110. In a particular embodiment, a GPEM 202 can be integrated into the housing 10. The GPEM 202 can include one or more processor boards that enable wireless communications, power cycling functions, as well other gaming functions. Details of some of the functions that can be provided using a GPEM are described in more detail with respect to U.S. patent application Ser. Nos. 12/943,789, 12/943,792, 12/943,797, 12/943,798, 12/943,802, previously incorporated herein by reference.

In one embodiment, the GPEM 202 can be configured to lighting functions, such as lighting functions associated with a candle device, and enhanced gaming machine functions, such as power-cycling. For example, a GPEM 202 in housing 10 can be configured to control the lights in stages 15 and 16 such that system 2 performs candle functions. In another embodiment, the candle functions can be controlled separately from the GPEM 202. For example, a light controller located in base 12 separate from the GPEM could be configured to receive candle commands from a game controller and in response activate to the command activate lights in stages 15 and/or stages 16. In this way, housings, such as 10, can be provided with or without a GPEM 202. Details of a housing 10 including an integrated GPEM 202 are described as follows with respect to FIG. 2.

In the instance, where a GPEM 202 is not included with system 2. The system 2 may only provide basic candle functionality. In one embodiment, when the GPEM is not included, the housing 10 can be formed differently. For instance, the housing 10 may not include the speaker 10 or the antenna 127 and may be made thinner. In another embodiment, a housing with a similar outer profile to housing 10 can be provided whether a GPEM is integrated into the cap or not. An advantage of this approach is that a similar or even identically looking system 2 can be provided independent of whether the GPEM functionality is included or not included with system 2.

Figure 2:
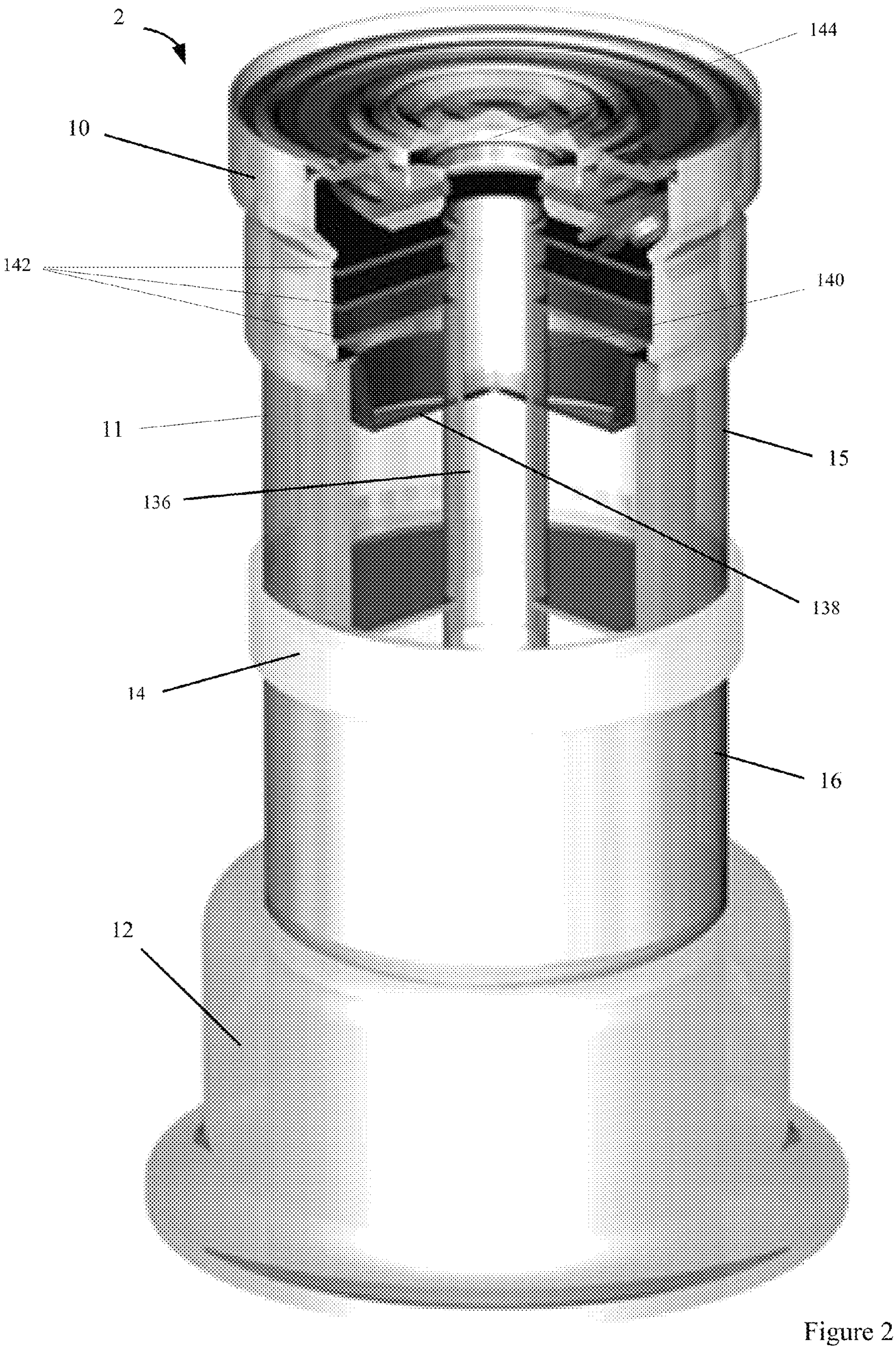
FIG. 2 is a perspective drawing of a system including a lighting device and a GPEM in accordance with the described embodiments.

FIG. 2 is a perspective drawing of a system 2 including a partial cut-away of a top portion of the housing 10. As described with respect to FIG. 1, the system 2 includes two stages, 15 and 16, separated by the divider 14. A GPEM is included in housing 10. In one embodiment, the GPEM can include 3 PCBs 142, disposed in different horizontal planes.

In other embodiments, the GPEM can include one or more PCBs. A center conduit 136 can extend from the housing 10 into the base 12. Power and data connections can run through the center conduit from the housing 10 and connect to one or more PCBs in the housing. Power and data connections routed through the center conduit can be connected to a wiring harness that extends from the base 12. Details of the wiring harness are discussed with respect to FIG. 3.

In one embodiment, the housing 10 including the GPEM can be utilized as a separate unit. A base, such as 138 can be included with the housing 10 and then a wiring harness can extend from the base 138 via an aperture in the base. In another embodiment, as described above, the housing may not include a GPEM. For instance, the housing 10 can be mostly hollow where a portion 140 of the central conduit 136 above the base 138, the speaker assembly 144 and the PCBs, such as 142, are removed. If desired when a GPEM is not included, the height of the housing 10 can be reduced to reduce the amount of hollow space. The base 138 can be formed without an aperture such that there is not a path from the interior of the housing 10 to an interior of the lighting device disposed below the housing. In this example, the base 138 can be mounted to the housing 11 of the lighting device, such that the housing 10 can be removed and/or replaced with another housing without the interior of the lighting device located below the cap being exposed.

In another embodiment, a speaker assembly 144 can be mounted to the housing 10. The speaker assembly 126 can add additional capabilities to the system 2. In one embodiment, the speaker assembly can be controlled by a controller located in the lighting device situated below the housing 10, such as a controller in base 12 of the lighting device. The base 138 of the housing 10 can include an aperture that allows a connection to extend from the interior of the lighting device and into the housing 10.

In yet other embodiments, the speaker assembly 144 can be mounted remotely from the GPEM 202. For instance, the GPEM 202 can be mounted somewhere within the system 2 and the speaker assembly 144 can be remotely mounted from the system 2 (e.g., the speaker assembly 144 can be mounted to a nearby gaming machine cabinet). In another example, speaker assembly 144 can be mounted within the system 2 and the GPEM 202 can be remotely mounted from the system 2. The GPEM 202 via a wired and/or wireless communication connection can be configured to remotely operate the speaker assembly 144. In a particular embodiment, the GPEM 202 can be configured to control a remote mounted camera and an audio device. In general, the GPEM 202 can be configured to control one or more remotely mounted devices.

Figure 3:
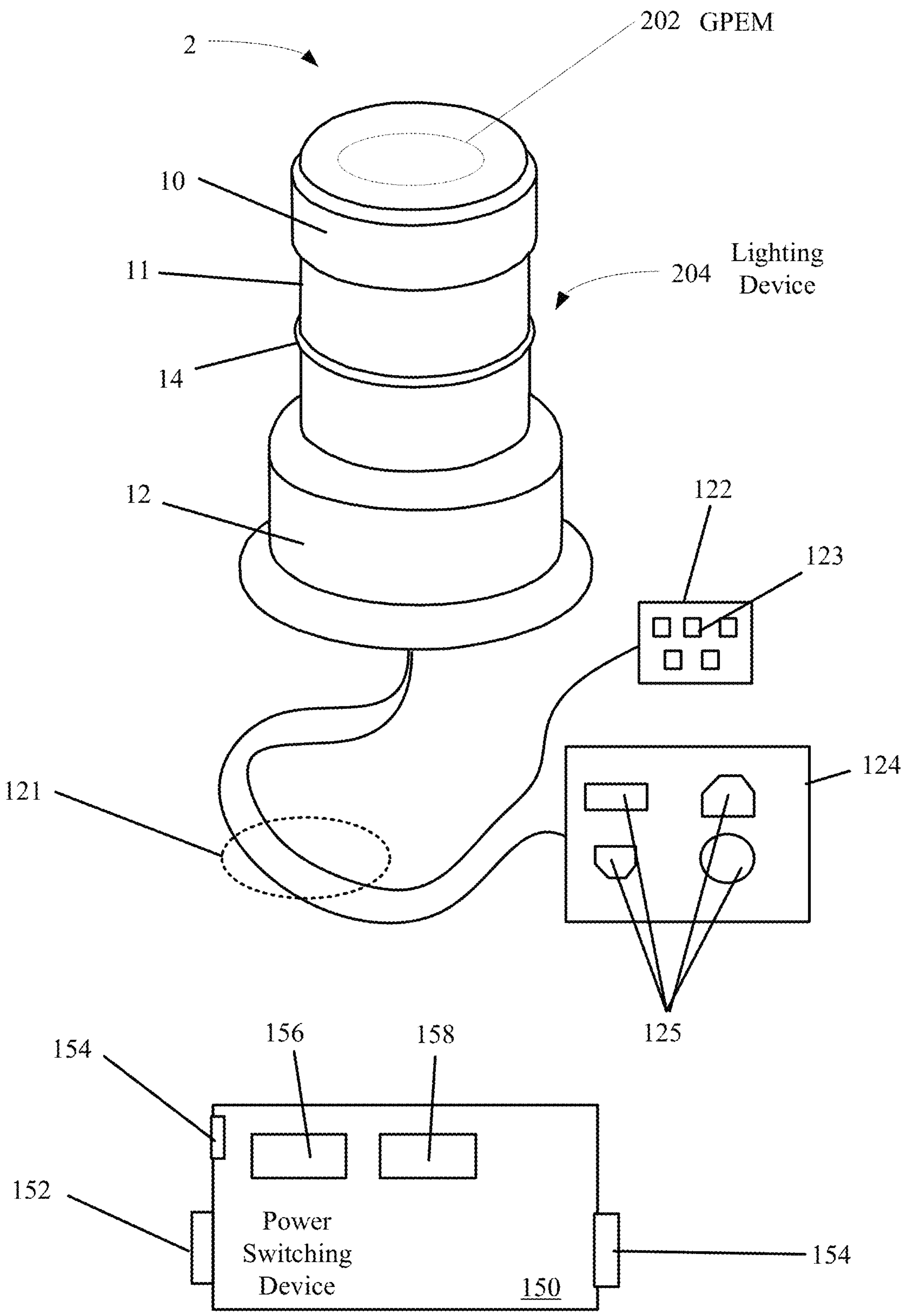
FIG. 3 is a drawing of system including a GPEM, a lighting device, a wiring harness and a power switching device in accordance with the described embodiments.

FIG. 3 is a drawing of a system 2. The system 2 can include a GPEM 202, a lighting device 204, a wiring harness 121 and a power switching device 150. In one embodiment, the GPEM 202 can be located in the housing 10, which sits above the lighting device 204. The lighting device 204 can include a housing with a portion 11 that can be light transmissive and a base portion 12 that is opaque. The light transmissive portion of the housing can be divided into two or more segments via dividers, such as the divider ring 14, where each of the segments can include lighting elements that are individual controlled.

A wiring harness 121 can extend from the base 12. The wiring harness can include a number of wires coupled to connectors, such as 122 and 123. The connectors can include data and/or power interfaces, such as 123 and 124. Via the data and/or power interfaces, the GPEM 202 and the lighting device 204 can receive power and send and/or receive data. In addition, in one embodiment, via the data and/or power interfaces a gaming device, such as a gaming device mounted to a gaming machine, can receive power and send and receive communications from the GPEM 202 or a device external to the gaming machine via the GPEM 202.

In a particular embodiment, the wiring harnesses can include a primary connector 122 and a secondary connector 124. The primary connector 122 can be used to connect a legacy power and data connections on a gaming machine. It is shown as a single component but can comprise multiple components. The legacy power and data connectors can vary from gaming machine to gaming machine and the primary connect can take different forms to allow for compatibility with different gaming machines. As an example, the primary connector 122 includes five apertures 123 for compatibility with legacy communication and data connections on different gaming machines.

The secondary connectors 124 can be used to add new data and power connections on a gaming machine and to reconfigure existing data and power connections on a gaming machine. The secondary connector 124 can include power and/or data interfaces, such as but not limited to four different communication and/or data connections 125. The form factor of the secondary connectors including the number and types of connections that can provided can be varied and are provided for the purposes of illustration only. Examples of power and/or data connections that may be included in a secondary connector include but are not limited to USB, DVI, HDMI, Ethernet, an audio jack, composite video, fiber optic, RS-232, RS-422, RS-485, component video, VGA, RGB, digital audio, IEEE-1394, IEC, PS/2, PCI express, PCI, PCI-X, RJ45, RJ11, ATA, SCART and S-Video.

In one embodiment, the system 2 can include a power switching device 150. The power switching device 150 can be configured to allow power to be cut and then restored for one or more gaming devices on the gaming machine. In one embodiment, the GPEM 202 can be configured to cycle power for the entire gaming machine. The GPEM 202 can be configured to receive a command via a wireless or wired communication to implement some type of power cycling on the gaming machine. In general, the GPEM 202 can use wireless, wired or a combination of wireless and wired communications. In response to the remote command, the GPEM 202 can be configured to send a command to the power switching device 150 to interrupt power. In another embodiment, the GPEM 202 can be configured to detect an error condition on the gaming machine and in response send a command to the power switching device 150 to interrupt power. In yet another embodiment, the GPEM 202 can be configured to detect an error condition that may be fixed using power cycling and send a request for an authorization to initiate a power cycling event to a remote device. The GPEM 202 can be configured not to implement the power cycling until it receives an authorization from a remote device.

When the GPEM 202 initiates a power cycling, the GPEM 202 can be configured to store information regarding the event, such as a time it was initiated, authorization information and machine state information including any detected error conditions to a non-volatile memory. After the power cycling is completed, the GPEM 202 can be configured to store information regarding an outcome to the power cycling event, such as whether the error condition was cleared and send information to a remote device indicating the power cycling has been completed and a status of the gaming machine after the power cycling event.

Returning to FIG. 3, the power switching device 150 can include a communication interface 154 that allows the power switching device to send or receive communications to the GPEM 202. In one embodiment, the communication interface 154 can be a wireless interface. In another embodiment, a wire and a connector (not shown) can be provided with the wiring harness 121 that can be coupled to the interface 154 so that data can be transmitted between the GPEM 202 and the power switching device. In another embodiment, an interface on one of connectors 122 or 124 can be used to establish a connection between the GPEM 202 and the power switching device 150. For instance, a wire connection can be made between one of the interfaces 125 on connector 124 and the interface 154.

In one embodiment, the power switching device 150 can include a power-in interface for receiving power and one or more power-out interfaces, such as 154, 156 and 158 for outputting power. The power-out interfaces can be switch controlled or can provide constant power. For example, in one embodiment, power-out interface 154, 156 and 158 can be coupled to a switch, such that power can be interrupted to devices receiving power via these interfaces. In one embodiment, each of the power-out interfaces, 154, 156 and 158, can be separately switched on or off. In another embodiment, two or more of the interfaces can share a common switch such that the two or more interfaces are switched on and off as group.

In yet another embodiment, one or more of the power-out interfaces can be un-switched. Thus, devices receiving power via an un-switched power interface can continue to receive power as long the power switching device is receiving power from the power-in interface 152. As an example, power-out interface 156 can be unswitched and power-out interfaces 154 and 158 can be switched. The GPEM 202 can receive power from the power-out interface 156 allowing the GPEM 202 to switch off power to other devices coupled to interfaces 154 and 158 while still receiving power via power-out interface 156. A few implementations of a power wiring scheme including a GPEM 202 and a power switching device 150 are described in more detail with respect to FIGS. 4A and 4B as follows.

Figure 4A:
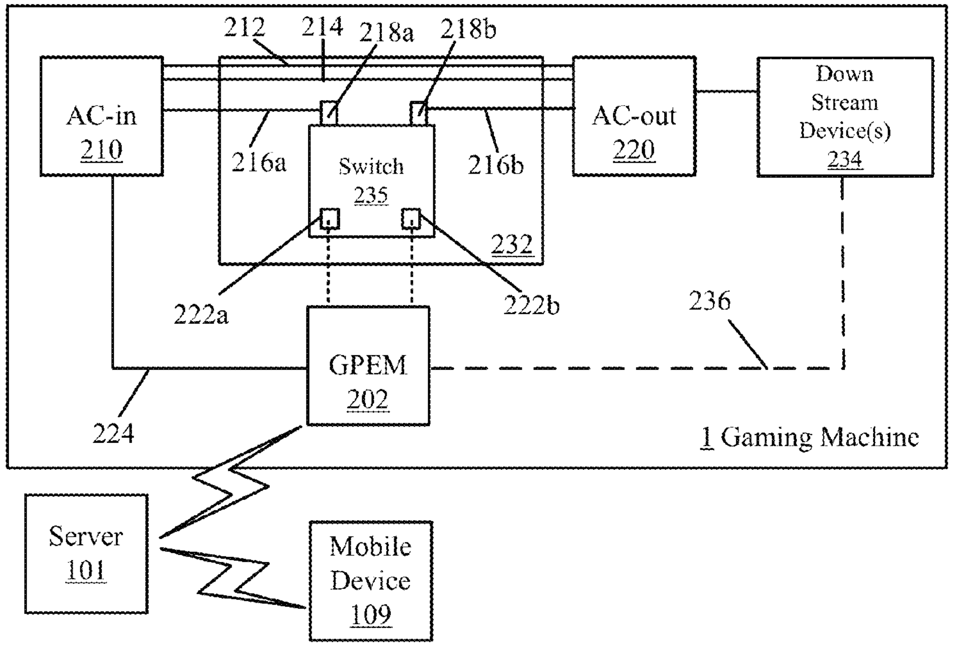
FIGS. 4A and 4B are simplified block diagram of systems allowing power cycling in gaming machines in accordance with the described embodiments.
Figure 4B:
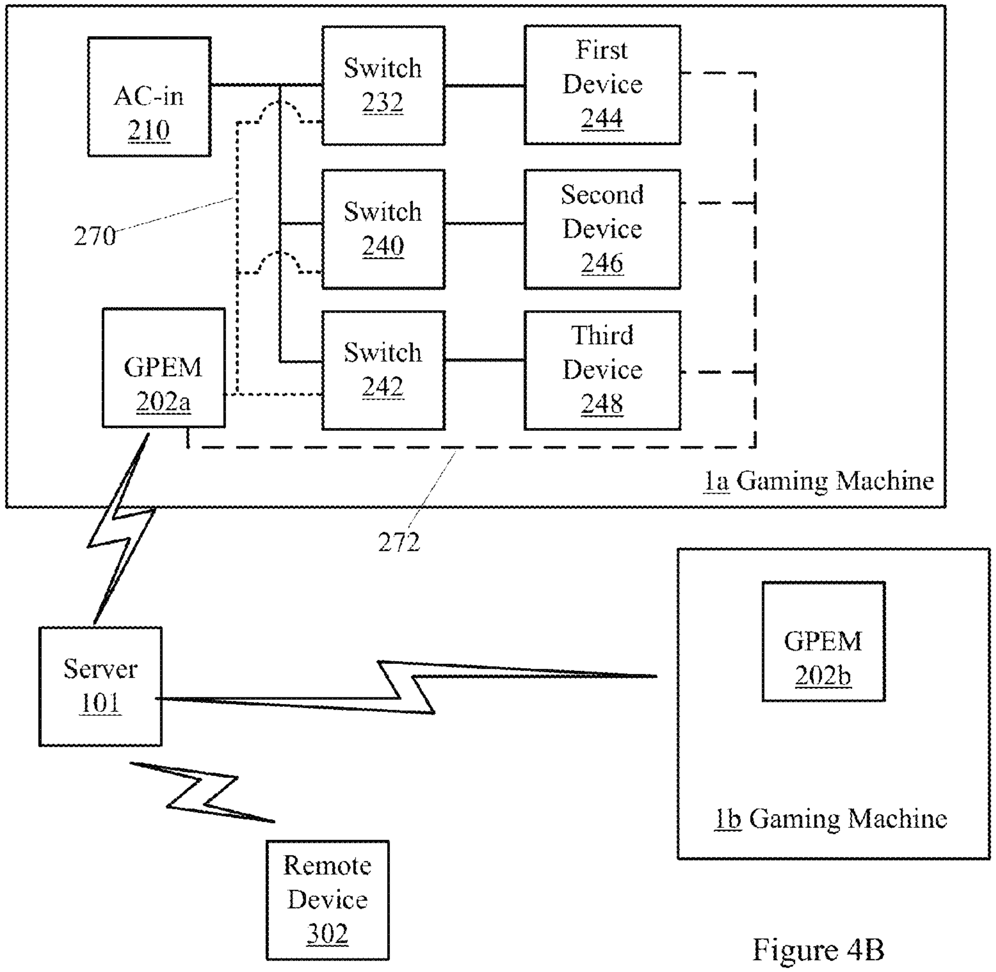

FIGS. 4A and 4B are simplified block diagram of systems allowing power cycling in a gaming machine. In FIG. 4A, a power switching device 232 can be configured to receive power-in from a power source, such as a AC or DC power source. In one embodiment, the power-in 210 can be an AC power-in. The AC power-in 210 can include 3 lines, ground 212, neutral 214 and power 216*a*. Although not shown, power can also be switched to a peripheral receiving power from a DC source.

In one embodiment, the power 216*a* can be connected to an input on 218*a* on a switch 235. The switch 235 can have an output 218*b* that allows power 216*b* that has been passed through the switch 235 to be received at the AC-out 220. In one embodiment, the switch 235 can be controlled with control signals input via DC inputs 222*a* and 222*b*. One of the inputs 222*a* or 222*b* can be ground and the other can be a power input. The GPEM 202 can be configured to generate the control signals that allow power travelling through switch to be interrupted. In one embodiment, an opto-isolator circuit can be interposed between the circuitry associated with the AC power and the DC control circuitry to prevent voltage surges from the AC power from travelling into the DC control circuitry and damaging the GPEM 202.

Figure 6:
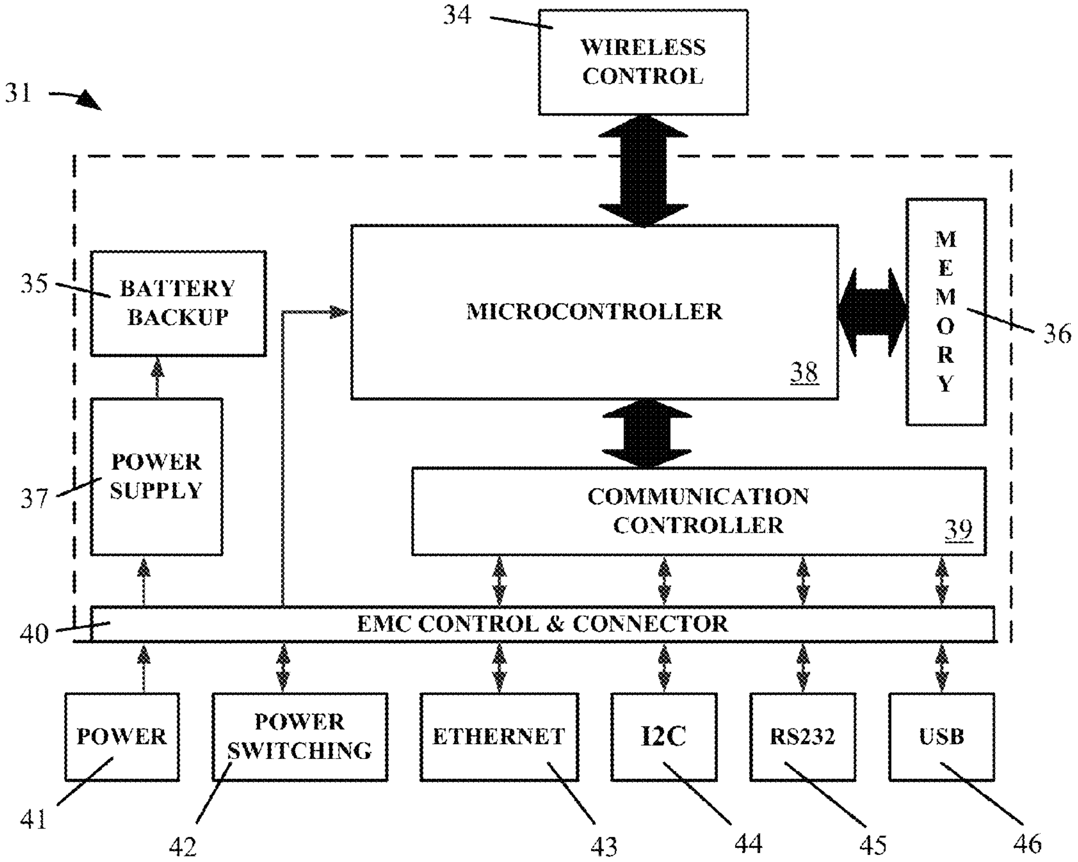

In a particular embodiment, the DC control inputs 222*a* and 222*b* can be coupled to the GPEM 202 via an RS-232 compatible connection (e.g., see 45 in FIG. 6). For instance, pins 4 and 5 on the RS-232 connection can be connect to the control inputs 222*a* and 222*b* to switch the voltage from −10V to 10V. The switch 235 can be configured to actuate in response to a particular voltage signal. In one embodiment, the switch 235 can be configured to default to a closed position where power is passing through the switch. When the GPEM 202 delivers an interrupt signal the switch can be opened and the power passing through the switch can be interrupted. When the interrupt signal ceases, the switch closes and the power passing through the switch 235 can be restored. An advantage of this approach is that if the GPEM 202 is turned off or malfunctioning in some manner such that it disabled, it is likely it will not produce a signal to interrupt power. Thus, devices connected to the AC-out 220 can still receive power.

A number of down-stream devices 234 can receive power via the AC-out 220. In a particular embodiment, the switch 235 can be located near the source of the AC-power for the entire gaming machine 1 such that power can be interrupted to all of the devices including the game controller and the peripheral devices on the gaming machine 1 at the same time. The GPEM 202 can be configured receive un-switched power 224, such that while power is interrupted to the game controller and the peripheral devices, the GPEM 202 continues to receive power as long as power is being supplied to the gaming machine 1 from its outside source.

As will be discussed in more detail as follows, the GPEM 202 can be communicatively coupled 236 to one or more of the down-stream devices, such as the game controller and one or more of the peripheral devices. Further, the GPEM 202 can be in communication with a server 101 and one or more devices via the remote server, such as mobile device. In one embodiment, the GPEM 202 can be configured to detect an error condition on the gaming machine via its communication with the one or more down-stream devices. The GPEM 202 can be configured to determine a course of action, which can involve one or more steps that can correct the error condition where one of the steps can involve cycling power on the gaming machine 1 via actuation of switch 235. Then, the GPEM 202 can be configured to implement the course of action including sending a signal to the switch 235 to interrupt power.

In one embodiment, the GPEM 202 can be configured to implement a power cycling event autonomously, determine a status of the gaming machine after the power cycling, such as whether the error condition has been cleared and then report the power cycling event and the gaming machine status after the event to the server 101. In another embodiment, the GPEM 202 prior to initiating a power cycling event can send an authorization request to a remote device, such as the mobile device 109, via server 101. The authorization request might describe the gaming machine, such as its location, information about the error condition and when the error condition has occurred.

In another embodiment, authorization request information can be output to a display on the mobile device via an application executing on the mobile device. For example, information regarding a current status of the gaming machine and its location can be output to the display. As another example, the application may be able to output current image data obtained from the GPEM associated with the gaming machine or a security system that shows the current status of the gaming machine, such as whether a player is nearby and has been affected by the error condition.

In one embodiment, the mobile application can be configured to generate an authorization message to begin the power cycling on the gaming machine after receiving one or more inputs from an operator of the mobile device 109. For instance, the operator may have to provide some inputs that indicate their identity. After sending the authorization message, the GPEM 202 may wait to initiate the power cycling event until an authorization message has been received, such as an authorization message received from the mobile device 109 via server. Once it is has received the authorization, the GPEM can proceed with the power cycling, determine the status of the gaming machine 1 after the power cycling and report the status of the gaming machine after the power cycling to the server 101 and/or one more remote devices, such as mobile device 109.

FIG. 4B shows a system including two gaming machines, 1*a* and 1*b*, each including GPEMs 202*a* and 202*b*, respectively. The GPEM 202*a* and 202*b* can be communicatively coupled to the server 101, such as via wireless communication connections. The server 101 can be configured to generate and send commands to the GPEMs 202*a* and 202*b*. Further, the server 101 can enable communications between the GPEMs 202*a* and 202*b* and the remote device 302 where the remote device can be configured to send commands to the GPEM 202*a* or the GPEM 202*b*. For instance, the remote device can be configured to send a command to either one of the GPEMs 202*a* and 202*b* to initiate a power cycle event. In some embodiment, the remote device 302 can be configured to power cycle two or more gaming machines simultaneously.

Gaming machine 1*a* can include multiple switches, 232, 240 and 242, coupled to a power source 210. The switches can be individually controlled by GPEM 202*a* via connection 270 to separately power-cycle one or more devices coupled to each switch. For instance, switch 232 can be coupled to first device 244, switch 240 can be coupled to a second device 246 and switch 242 can be coupled to a third device 248. The GPEM 202*a* can be configured to receive information and possible communicate with each of the devices, 244, 246 and 248 via communication connection 272.

Using the control connections 270, the GPEM 202*a* can be configured to power cycle one of the devices while power is maintained to the other devices through the other switches. For instance, a player tracking unit can be coupled to switch 232 while other gaming devices can coupled to switch 240 and 242. The GPEM 202*a* can be configured to maintain power to the other gaming device while only cycling power to the player tracking unit, such as to clear an error in the player tracking unit. In another example, power can be interrupted through two of the switches while power is maintained through one of the switches. In yet another example, power could be interrupted at each of the three switches simultaneously.

In one embodiment, two switches can be connected in-line with one another such that two switches may be able to interrupt power to a single device. For instance, a first switch 232 may be coupled a first group of the devices on the gaming machine such that the GPEM 202*a* can power cycle the first group of gaming devices. The second switch 240 can be disposed downstream of the first switch 240 such that a subset of the first group of devices can be power cycled while the remainder of the devices in the group receive power. For example, the first switch 232 can be configured to power cycle a game controller and all of the peripheral devices on the gaming machine 1*a* including a printer and a bill/ticket validator while the second switch 240 can be configured to just power cycle the printer and the bill/ticket validator while the other devices, such as the game controller, receive power.

Figure 5:
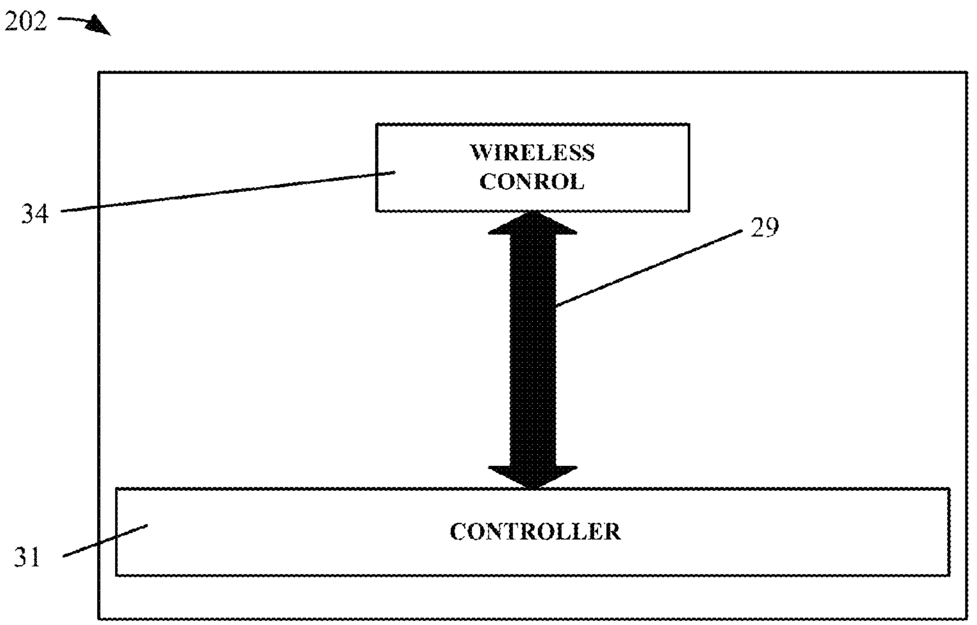
FIGS. 5 and 6 are block diagrams showing control functions in a GPEM in accordance with the described embodiments.

FIG. 5 is a simplified block diagram of a GPEM 202. In one embodiment, the GPEM 202 may be abstracted to include two modules as shown in the block diagram FIG. 5. The modules are provided for the purposes of illustration only and different embodiments of the devices described herein can be abstracted to include more or less than the two modules shown in FIG. 5. In FIG. 5, a controller 31 is shown. The controller 31 can be configured to provide a wireless interface to and from a gaming device in which it is installed, such as a gaming machine via a wireless control module 34. In one embodiment, the wireless control module can be coupled to the controller 31 interconnected via address/data bus 29.

The wireless control module 34 can be configured to provide the wireless interface between the GPEM 202 and one or more remote gaming systems, such as WAP, player tracking and/or a cashless system. The wireless control module 34 can be configured to allow remote communication connections to be easily added or reconfigured on a temporary or on-going basis. For instance, the wireless control module 34 can be used to establish a temporary or one-time connection between the gaming machine and a remote device, such as but not limited to a third-party server, a user's mobile device or another gaming machine, or an on-going connection between the gaming machines and a remote device, such as a casino server. The capability to easily add or remove communication connections may be advantageous during such activities as rearranging gaming machine on a casino floor or moving a gaming machine from one location to another location.

FIG. 6 is a block diagram of a GPEM control module 31 shown in FIG. 5. In one embodiment, all of the inputs and outputs can pass through an EMC control & connector component 40, providing electromagnetic compatibility limiting unwanted emissions from the controller 31 and limiting the susceptibility or immunity from unplanned electromagnetic disturbances. This type of connector may be required to conform to EMC standards such as FCC Parts A & B, IEC, and CSAA.

The power input 41 can be configured to provide the input voltage source for the power supply 37. Typically, input voltages range 12V to 24VDC. The power supply provides the various output voltage sources for the internal circuits of the controller 31 for the GPEM. As described above, the power input can be connected to an un-switched power source so that power can be maintained to the GPEM while power is being cycled to one or more devices on gaming machine via a power switching device coupled to the gaming machine. The power switching can be carried out via the power switching interface 42. Via the power switching interface 42, the controller 31 can send commands to one or more power switches that result in a power supply being interrupted.

The controller 31 can include voltage conversion circuitry, such as step down circuitry that enables devices requiring varying voltages less than the input voltage to be supplied with power. The stepped down voltages can be provided to devices internal to the GPEM or to devices coupled to the GPEM via one of its power and/or data interfaces, such as a USB device coupled to the GPEM via interface 46. In one embodiment, the power input 41 can be used to provide the charging voltage source for the battery backup circuit 35.

Many gaming jurisdictions require certain devices, such as security monitoring circuitry on a gaming machine, to include a battery backup in case of casino or machine power failure. Further, the gaming jurisdictions can require a back-up transmission method for receiving data preserved and/or gathered during a power failure. The machine power failure could be a result of a main power grid failure or a local machine power failure that resulted from an attempted security breach (e.g., deliberately cutting power to the gaming machine) or other reasons. The security monitoring circuitry can be configured to detect and store any attempt to open any gaming machine door during the power failure or during a power cycling event. The monitoring circuits are typically part of the gaming machine's components. In one embodiment, the monitoring circuits can be linked to the controller 31.

A battery backed-up transmission method can be configured to provide a way to communicate security information during or immediately upon a power-up. In one embodiment, the method can allow for limited communications even during the power-interruption, such as an alert that a security related event is now in progress or that power has been lost to the gaming machine. The power-up can process can be initiated any time a gaming machine loses power, such as after a gaming machine is moved within the casino, transferred to another location outside the casino or following a power failure. The battery backup 35 can be used to provide a power back-up for one or more of the memories within the controller 31 and provides a timing wake-up input to the controller 31 and wireless control 34 to store and communicate any security information received at the GPEM from remote sensors, such as sensors within a cabinet of a gaming machine from which the GPEM can receive information, or security information detected from sensors associated with the GPEM. For instance, a camera in the GPEM can be used as a sensor to gather security information. The timing set point can be minutes or hours depending on jurisdictional or/and operator requirements.

In one embodiment, all of the communication channels can be routed through the GPEM interface with the communication controller 39. The communication channels can be associated with pass through communications, such as communications from an external device routed to the gaming machine via the GPEM or communications generated at the game controller, player tracking controller or a peripheral device and sent to a remote device via the GPEM. Further, communications sent from the microcontroller 38 or sent to the microcontroller 38 can be routed through the communication controller 39.

The controller 31 an provide support various communication protocols. For instance, the communication channels can implement one or more of Ethernet 43, I2C 44, RS-232 45 and/or USB 46. Other communication protocols that may be used are RS-485, IEEE 1394 (Firewire), Netplex and other standard or proprietary communication interfaces used in the gaming industry. If available, these channels can be implemented as wired or wireless embodiments. For instance, a wireless communication protocol, such as wireless USB, can be implemented to allow for wireless communications between the GPEM and other devices within the gaming machine. In one embodiment, the GPEM can be configured to wirelessly communicate with a power switching device residing within the gaming machine.

Depending on the number of gaming systems to which a gaming machine is connected (see FIGS. 7 and 8), some gaming machines may utilize only a single external communication channel connection while others may utilize multiple channels. The communication controller 39 can be configured to provide the non-intrusive multiplexing and de-multiplexing of the communication interface data. Thus, the communication controller can be implemented with no change or interference to any protocol or related data from or to the gaming machine. The non-intrusiveness can allow an existing gaming machine to be equipped with a GPEM and utilized for external communications purposes without altering existing gaming software or gaming system software as well as without interference between protocols or related data from or to the gaming machine. In additional embodiments, the communication controller 39 can be configured to detect player messages from a player tracking unit and communicate with a player tracking system.

The microcontroller 38, which can comprise a processor and a memory, can be configured to provide the operational control for the wireless control module 34 and the GPEM control module 31. In one embodiment, the microcontroller can include one or more ARM processors, but other types of micro-processors can also be utilized. The operating system and static memory for the microcontroller 38 can be stored in the memory 36. In particular embodiments, the microcontroller 38 can be configured to receive software and/or firmware upgrades for itself, a game controller on the gaming machine and/or peripheral devices on a gaming machine from a remote device. The microcontroller can include functions for verifying the authenticity of downloaded firmware and/or software. Further, it can include hardware or software for decrypting the downloaded firmware and/or software. In general, the microcontroller can include hardware and/or software for encrypting and decrypting in-coming or outgoing communications.

Figure 7:
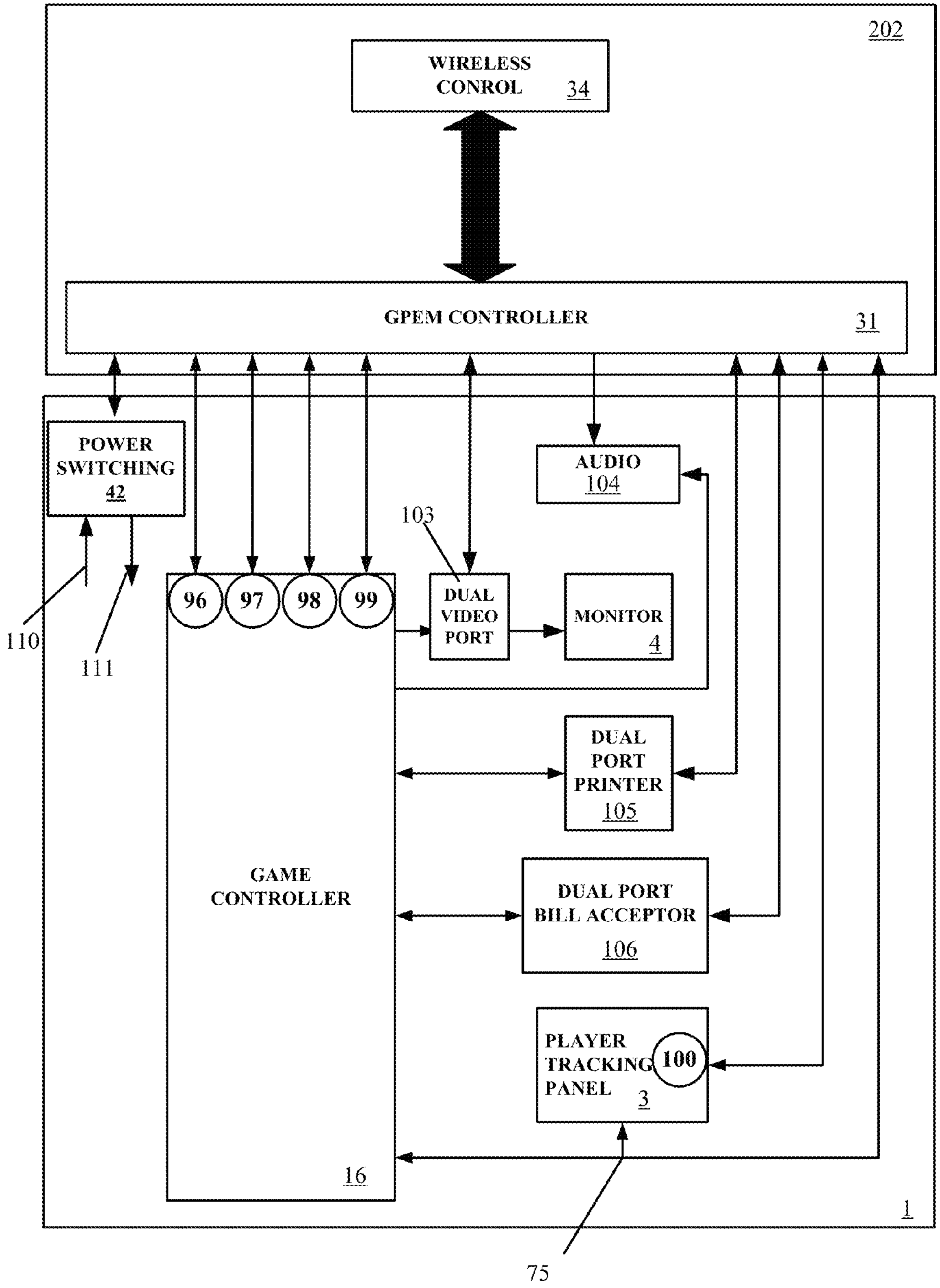
FIG. 7 is a block diagram that illustrates an interface between a GPEM and a gaming machine in accordance with the described embodiments.

FIG. 7 is a block diagram that illustrates the interface of an embodiment of GPEM 202 with a gaming machine 1. The embodiment in the block diagram of FIG. 7 shows the optional elements of a dual-port bill acceptor 106, a dual-port printer 105, dual video port 103, a dual port audio system 104, and a monitoring connection 75 of the player tracking panel 3. Dual port capability can be used to provide a non-intrusive method of maintaining system integrity and provide additional gaming features including promotional opportunities using embodiments of the gaming devices, such as the GPEM devices described herein.

Communication links, which can be wired or wireless, are shown between communication interfaces TITO (Ticket-In/Ticket-Out) 97, link progressive 98, WAP 99, and player tracking 100 and associated communication interfaces on the GPEM 202. In this example, the communication interfaces are associated with the controller 31. In general, a gaming machine deployed in the field can interface with one or more external systems and the GPEM 202 can include multiple ports to provide communication support for gaming machine that interface with multiple systems.

The controller 31 can be configured to provide the multiplexing of the data streams from the gaming machine communication ports. The resultant data stream can then be encrypted and sent to the wireless control module 34. The wireless control module 34 can then transmit the data to one or more remote devices (A few examples of communication links between a GPEM, such as 202, and a number of remote devices are described as follows with respect to FIG. 8.). The GPEM 202 can be configured to receive communications from one or more remote devices, de-multiplex the communications and provide decryption of the data stream. The decrypted data can be sent to the respective communication interfaces of the gaming machine 1, such as 97, 98, 99 and 100.

Power switching 42 can receive power via interface 110 and output power via interface 111. One or more of the game controller 16, the audio device 104, the monitor 4, the dual port printer 105, the dual port bill acceptor 106 and the player tracking 3 can be connected to the power switching 42. The power switching 42 can be controlled by the GPEM 202 to interrupt power to the one or more devices connected to the power switching 42 as part of a power cycling event. As described above, a power cycling event may be initiated to clear an error condition on one of the devices.

In a dual port device, a first port can be used to provide the existing communication peripheral interface from the gaming machine. The game controller and the peripheral device can communicate via the first port in a manner fixed by the use of regulated gaming software by the game controller and regulated software and/or firmware used by the peripheral device.

The second port can be used to provide an enhanced interface with the GPEM 202. The second ports on the dual port devices may be connected to the GPEM 2 via an appropriate interface, such as one of the ports shown on FIG. 6. The GPEM 202 can be configured to receive commands and/or data from remote devices that are sent to the dual port devices via the second port. Further, the GPEM 202 can be configured to receive data from the dual port devices that are sent to one or more different remote devices via the GPEM 202. As described above, the data can be used to diagnose error conditions on the dual port devices and to determine a status of the devices, such as a status of a dual port device after a power cycling event has been implemented on one of the devices.

The dual-port bill acceptor 106 can be configured to read tickets (TITO) and paper currency and communicate this information on the first port, which is controlled by the regulated game program. The dual-port bill acceptor can also be configured to read special promotional tickets and communicate this information on the second port to the GPEM 202. In addition, the dual-port bill acceptor can provide cash and operational information to the casino operator on the second port to the GPEM 202. The GPEM 202 can be configured to send this information received from the bill acceptor to a remote device. JCM (Las Vegas, Nev.) is one example of a manufacturer that provides dual-port bill acceptors.

The dual-port printer 105 can be configured to print tickets (TITO) provided by data on a first port, which is controlled by the regulated game program, or special promotional tickets provided by data on a second port. The promotional tickets can be customized and regularly updated. In one embodiment, the tickets can be personalized based upon an identification of a player at the gaming machine. In addition, the dual-port printer can be configured to provide operational information to the casino operator on a second port. FutureLogic (Glendale, Calif.) is one example of a manufacturer of dual port printers.

Dual-port video provides picture-in-picture (PIP) capability. Video data can be transmitted from the GPEM 202 and superimposed as a PIP on the game machine monitor. In one embodiment, the video can be transmitted via a USB interface. The PIP can be used by the casino operator to provide real-time or stored video information for the player. The PIP can be placed anywhere on the monitor screen, so no important game display is covered, which is controlled by the game program. This feature can be important for a video slot machine.

Further, the GPEM 202 can be configured to monitor a state of the gaming machine and based upon the state determine if it is “safe” to use certain portions of the monitor screen, such as the monitor screen of a video slot or video poker machine. For instance, if the gaming machine is in an attract state or an idle state and one of these states is detected by the GPEM 292, then, the GPEM may be configured to utilize a different portion of the monitor screen, such as the entire monitor screen, than when the gaming machine is in a game state and a game is being generated on the monitor screen.

The state monitoring capability can also be used to prior implementing a power cycle event. For instance, the GPEM 202 can be configured not to implement a power cycling event unless it is determined the gaming machine is in a non-operational state (malfunctioning) or the gaming machine is in an idle state with no credits available for game play. In one embodiment, the GPEM 202 can include an image capture device. Images from the image capture device can be used to determine a status of the gaming machine, such as whether a user is currently nearby.

In another embodiment, control of the monitor screen can be handed to the GPEM 202 by the game program. For instance, the game program may allow the GPEM 202 to display a bonus game presentation on the monitor screen. The video data for the bonus game presentation can be output via the second port on the monitor screen. As described above, using the GPEM 202 in this manner can allow a portion of the content associated with a game, i.e., bonus game presentations, to be regularly updated on a gaming machine without changing the regulated portion of the gaming software.

The audio channel on the dual port audio system 104 can be used to provide the ability to use the existing game machine audio speakers to provide voice and audio for the player that is not part of the game program. Further, the second port can be used to provide audio that is part of a bonus game presentation as described in the previous paragraph. The player tracking monitoring port can be used to provide non-intrusive monitoring of the player tracking data to provide player ID information for the casino operator. In one embodiment, this data can be utilized by the GPEM 202 to provide custom content to a player. For instance, the player ID data can be used to target a personalized promotional opportunity selected based upon known information about the player. The personalized promotional opportunity can include a custom ticket that is printed by the printer. The customized ticket can include custom graphics and player identification information, such as the player’s name.

In particular embodiments, when a dual port device, such as the bill acceptor 106 includes regulated software, such as regulated firmware, the regulated software can be decoupled from other software on the peripheral device. The regulated portion of the software may govern interactions between the peripheral device and the game controller 16. Changing the regulated portion of the peripheral software typically requires a lengthy approval process.

The non-regulated portion may involve interactions that do not involve the game controller 16 and thus, a gaming control board may allow this portion of the software to be updated without regulatory approval or under a much less stringent approval process. In various embodiments, the unregulated or less regulated portion of the peripheral software can be updated via the GPEM 202. For instance, if a new fraud detection algorithm is needed, such as to detect a new type of counterfeit currency, then the new detection algorithm can be downloaded to the bill acceptor via the second port of the dual port bill acceptor. If necessary, the power on the dual port bill acceptor can be cycled to allow the bill acceptor to restart using the new software or firmware.

Figure 8:
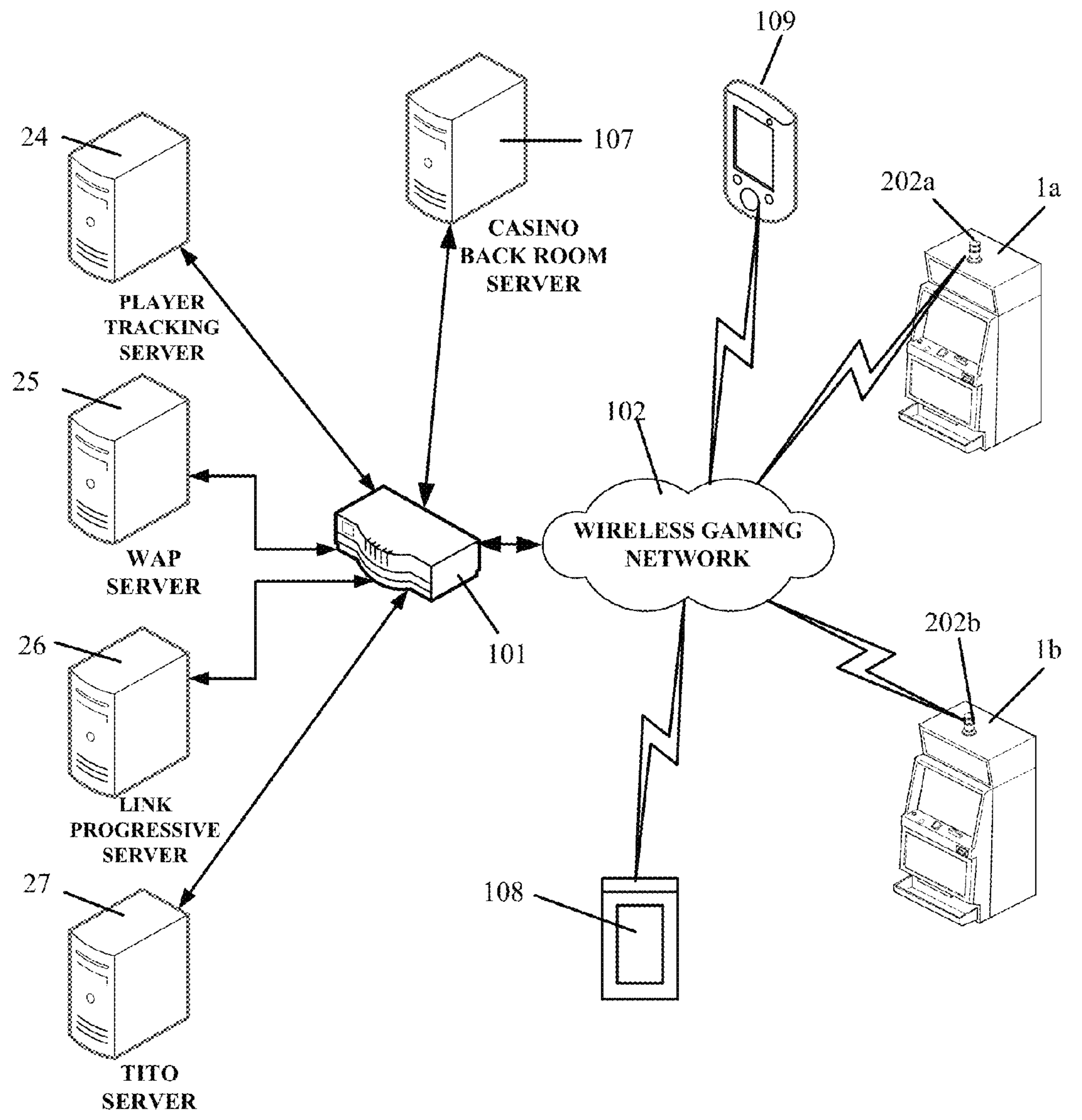
FIG. 8 is diagram of a gaming system including gaming machines outfitted with GPEM's that wirelessly communicate with servers and can receive power switching commands from a mobile device in accordance with the described embodiments.

FIG. 8 is a diagram that illustrates a gaming system including gaming machines outfitted with GPEM that wirelessly communicate with servers in accordance with the described embodiments. In one embodiment, the gaming system can include one or more gaming machines, such as 1*a* and 1*b*. The gaming machines can be different models and types supplied by different gaming machine manufacturers. The gaming machines can each be equipped with GPEMs, such as 202*a* and 202*b*.

The GPEMs can be configured for wireless communications. Using the wireless capabilities of each GPEM, a gaming network 102 can be provided. Via the gaming network 102, the wirelessly enabled GPEMs, such as 202*a*, can communicate to a system controller 101. The system controller 101 can be configured to provide similar functions as the wireless control module 34 and the GPEM controller 31.

The system controller 101 can transmit and receive data via the gaming network 102. In one embodiment, the system controller 101 can be configured to de-multiplex/de-encrypt the data stream from the gaming machines equipped with wireless capabilities and send the resultant data streams to the respective gaming system servers. Examples of servers that can receive data streams from the system controller 101 include but are not limited to the player tracking server 24, the WAP server 25, link progressive server and the TITO server. These servers can also communicate with one or more of the gaming machines by routing communications through the system controller. The system controller can also be configured to enable communications between gaming machines, 1*a* and 1*b*.

A few other examples of servers that can be coupled to the wireless gaming network 102 via the system controller 101 can include servers in other gaming establishments, servers associated with gaming regulators, third-party servers, servers providing game downloads and peripheral software updates, security server, servers providing hotel hospitality, travel, weather and lodging information and outside access to servers via the Internet. As an example of a server in another gaming establishment, the system controller 101 can be configured to contact a remote TITO server in another gaming establishment to validate a printed ticket remotely issued outside of the gaming establishment in which the system controller is located and forward the validation information to a gaming machine. As an example of a communication with a gaming regulator, the system controller 101 can be configured to communicate with a gaming regulator to notify the regulator of a regulated change to a gaming machine, such as a change in regulated gaming software on the gaming machine.

Gaming operators can allow third-parties affiliated with a gaming establishment to provide promotional opportunities to players on gaming machines. The system controller 101 can be configured to communicate with a gaming machine to provide a third party promotional opportunity. As an example, via the system controller 101 and the wireless gaming network 102, a ticket can be printed at the gaming machine that allows a discount on a merchandise item or a service provided by the third party. In some embodiments, the tickets can be customized using a format selected by the third party and approved by the gaming operator.

The system controller 101 can be configured to allow a remote server to communicate regulated or unregulated gaming software to a gaming device. Regulated gaming software typically includes logic related to generating a wager-based game on the gaming machine, such as determining an outcome and an associated award. An example of unregulated gaming software may include firmware used by a peripheral device, such as firmware used by a bill validator or printer to report information used for health monitoring, firmware used by a bill validator to detect fraudulent currency or firmware used by a printer to print customized tickets. If the bill validator accepts a bill or an instrument that is later determined to be counterfeit, then new software can be downloaded to the bill validator to detect other bills or instruments with similar characteristics so that additional counterfeit bills or instruments are not accepted. The system controller 101 can also be configured to transmit and receive verification information that allows a remote server to verify that authentic software has been installed on a gaming device, such as gaming machine.

Each gaming machine can be connected to a different combination of gaming system servers, such as but not limited to a player tracking server 24, WAP server 25, link progressive server 26, and the TITO Server 27. For instance, a first gaming machine can be connected to only the casino back-room server 107 while a second gaming machine can be connected to the player tracking sever 24 and the TITO server 27. The system controller 101 can be configured to allow different gaming machines to receive different data streams depending on a current server connection configuration. A current connection configuration for a particular gaming machine, such as adding a new connection to a server or removing a current connection to a server can be implemented via operator communications with the system controller 101.

The system controller 101 can be configured to provide the multiplexing of the data streams from the gaming system servers and then encrypt the resultant data stream before transmitting. The data streams can be encrypted to prevent tampering and misuse of any data sent in the data streams. The wireless gaming network 102 may use one or more common wireless technologies such as Zigbee, 802.11a/b/g/n, and 3G/4G. Also, optical transmission technologies, such as IR and laser, can be utilized alone or in combination with other transmission technologies. In other embodiments, power-line transmission technologies or other wired communication technologies can also be utilized alone or in combination with one or more different wireless technologies as part of a gaming network.

Existing gaming systems typically use some form of a protocol stack. There are standard gaming protocols, such as S2S, G2S developed by the Gaming Standards Association (GSA) and SAS developed by IGT as well as many other proprietary protocols used in the gaming industry. The protocols are used by gaming systems, such as a player tracking system or a TITO system, to communicate data between the gaming machine and servers across a network. The gaming systems may also use encryption to protect data in transit. All of the gaming system's protocols and encryption techniques must be tested and approved by a gaming test lab and/or gaming control board to operate in their jurisdictions. In order to maintain integrity and security it is important not to tamper with or change the data streams of these gaming systems. The gaming system including the system controller 101, the wireless network 102 and GPEMs 202*a* and 202*b*, can be configured to provide a non-intrusive technique to transmit and receive the data provided by these various systems, i.e., without a modification to an existing protocol that would require additional testing and approval.

In yet another embodiment, a back room server 107 and a gaming table 108 can be added to the system. The back room server 107 can be used to provide some of the real time changes to the entertainment, informational and promotional opportunities available on a gaming machine, such as 1, or on a gaming table, such as 108. For instance, promotional tickets can be printed at gaming tables and gaming machines in a dynamic manner using the back room server 107. As another example, tournaments or other group games can be provided using the back room server 107.

Figure 9:
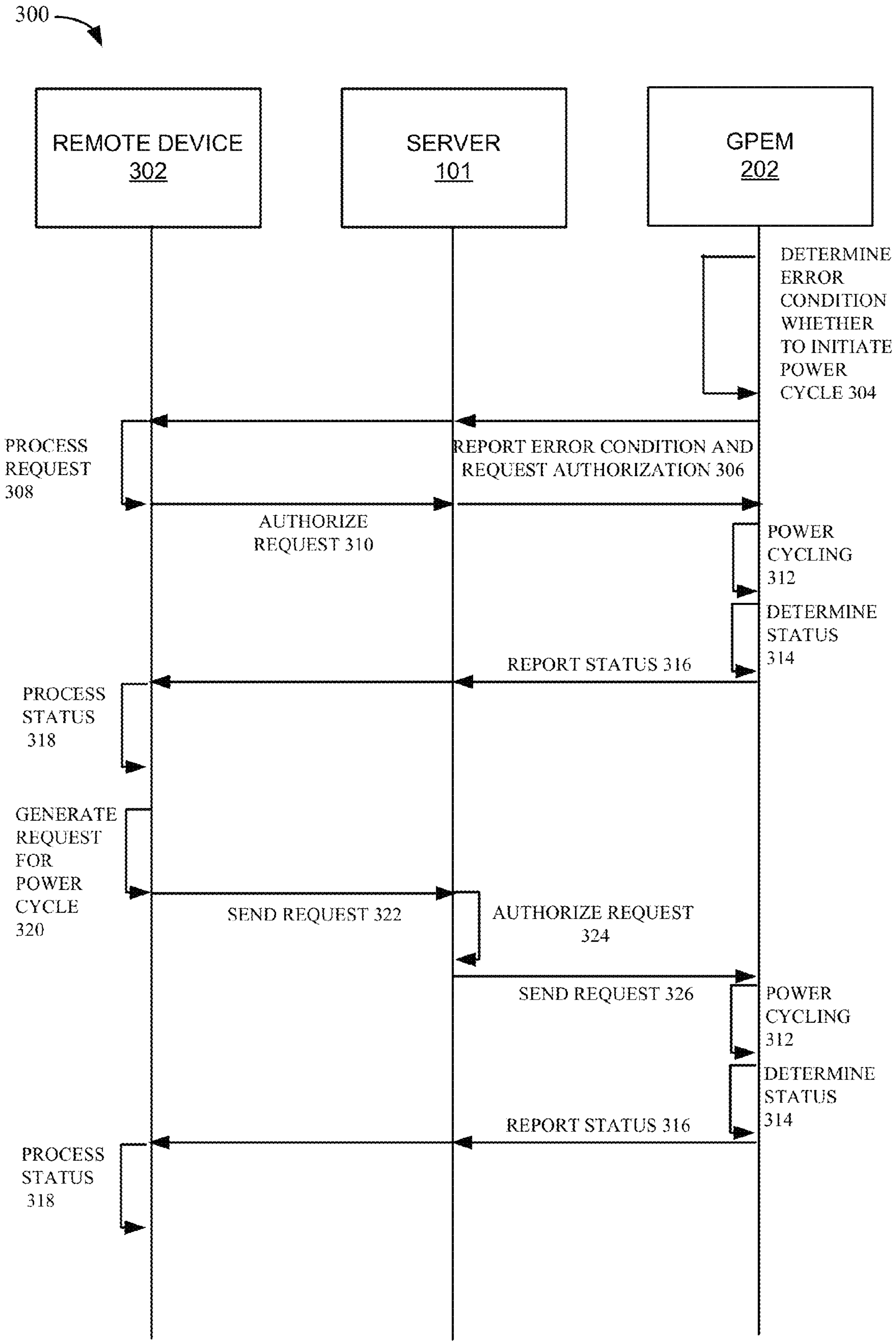
FIG. 9 is an interaction diagram between a remote device, a server and a GPEM in accordance with the preferred embodiments.

FIG. 9 is an interaction diagram between a remote device 302, a server 101 and a GPEM 101 in a system 300. In one embodiment, at least one server 101 can be configured to route communications between remote devices and one or more GPEMs, such as 202. The server can be configured to handle security tasks, such as 1) verifying whether the remote device is authorized to be on the network and communicating with a GPEM, such as 202 and 2) verifying that a user of the device is authorized to send commands and/or messages from the remote device to the GPEM.

Verifying whether the remote device is authorized to be on the network can involve receiving information, such as one or more unique identifiers associated with the remote device that are known to the server 101. For instance, unique identifiers can include but are not limited to a serial number, a model number, a MAC address, an IMEI (International Mobile Equipment Identity), an ICCID (Integrated Circuit Card Identifier) and a Mobile Equipment Identifier (MEID). The information received from the remote device can be encrypted/decrypted using an encryption protocol of some type. The server 101 can be configured to compare information received from the remote device with information stored on the server that is supposed to unique to the remote device. Based upon the comparison, the server 101 can determine whether to allow communications from the remote device to be sent to a GPEM, such as 202.

Verifying whether a user is authorized to be sending commands via the remote device can involve receiving information, such as one or more unique identifiers associated with the user that is known to the server 101. For example, the unique identifiers may include a password and/or biometric information. The information received from the remote device associated with the user can also be encrypted/decrypted using an encryption protocol of some type. The server 101 can be configured to compare information received from the remote device associated with the user with information stored on the server that is unique only to the user or only known by an authorized user (e.g., a password). Based upon the comparison, the server 101 can determine whether to allow communications from the remote device to be sent to a GPEM 202.

The verification of a device and/or a user can be performed the first time the remote device establishes communications with the server 101. The verifications can also be triggered on a message by message basis. For instance, the server 101 can be configured to parse the contents of messages for particular commands, such as a command to a GPEM to implement a power cycling on a gaming machine. Different commands can trigger different levels of verification, such as only a device verification, only a user verification or a device and a user verification. The server 101 can be configurable such that different verification schemes can be associated with different commands.

The server and or other devices in the system 300 can be configured to implement safeguards that can prevent unauthorized use of system 300, such as an attempt by an unauthorized user to implement a command across multiple devices. For instance, the system 300 can include safeguards that would make it difficult for a user to power cycle a large number of gaming machines at once or over a short period of time. A few examples of safeguards that can be implemented are described as follows.

One example of a safeguard is that a device in the system 300, such as 302, can be allowed to only implement a command, such as a power cycle, to one device at a time. For instance, a device, such as server 101, can log and track each time a remote device, such as 302, issues a power-cycling command to a GPEM. The server 101 can be configured to require a separate verification of the device and the user, each time a request to power-cycle a device is made. A new and separate verification and authentication for a power cycling on a second device may not be allowed until the power-cycling request for a first device has been completed. While the command from a remote device, such as a power cycling, is being implemented on a first gaming device, the server 101 can be configured to block the remote device from sending commands to other gaming devices.

In other examples of safeguards, a device in system 300, such as the server 101, can keep track of the requests to implement commands from a remote device, such as 302, over a time period. If too many requests are made over a particular time period, then the server 101 can be configured to block messages including commands from the remote device until authorization is received from another user on a different device where the user and device can be verified by the server 101. While authorization/verification is being carried out, the blocked messages can be queued. If authorization is not received, then the blocked messages can be removed from the queue and further messages from the device that sent the block messages can be blocked, i.e., the sending device can be removed from the system 300.

In yet another example of a safeguard, a GPEM 202 can be configured to keep track of commands it has received, such as power cycling commands originating from one or more remote devices. If too many such commands are received over a particular time period, e.g., 3 or more commands received in an hour, then the GPEM 202 can be configured to not implement any additional commands until an additional authorization/verification has been carried out. In one embodiment, as described above, the commands can have been routed through a server 101. In another embodiment, the GPME 202 can be configured to receive commands directly from a remote device. In this embodiment, the GPEM 202 can be configured to carry authentication/verification procedures as described above for the server 101.

In further examples of safeguards, the system 300 can be configured to only implement a command from a remote device, such as 302, when it is determined the remote device is within physical proximity of the GPEM, such as 202. For instance, the GPEM can be configured to communicate with the remote device via a wireless communication interface with a limited range, such as blue tooth and only implement a command, such as a power-cycling, when a communication connection has been established with the remote device. In another example, it can be possible to determine a physical location of a remote device using GPS or radio triangulation where one or more devices in the system 300 can be configured to not authorize an implementation of a particular command unless it is determined that the remote device, such as 302, and the GPEM 202 are within some allowed distance of one another.

In yet another example, a remote device, can be configured with a visual pattern. For instance, the remote device can include a sticker with a bar-code. Before a command is implemented, the remote device can be placed proximate to an image capture device on the GPEM 202 such that the pattern can be identified in image data captured by the GPEM. A device in the system 300 can be configured not to authorize the implementation of a command until it is determined the visual pattern is an expected visual pattern, such as a visual pattern assigned to a particular remote device registered with system 300.

In another embodiment, a device in system 300 can be configured to generate a unique information pattern, such as a visual pattern and/or unique audio pattern, which can be output via the remote device and detected by the GPEM. For instance, after a request to implement a power cycling has been received by the system 300, a unique information pattern can be sent to the remote device. Then, the remote device can be brought into the vicinity of the GPEM and the information pattern can be output by the remote device. For instance, a visual pattern can be output to a display screen associated with the remote device that can be received by an image capture device on the GPEM and/or a sound can be output by the remote device which can be detected by a microphone on the GPEM. The GPEM and/or a remote device can be configured to compare the information pattern output by the remote device and captured by the GPEM with the information associated with the transaction. If the information pattern received by the GPEM matches the information pattern associated with the transaction, then one or more commands, such as a power cycling command, associated with the transaction can be authorized and carried then carried out by the GPEM.

Returning to FIG. 9, an interaction between the remote device 302, server 101 and GPEM 202 involving a power cycling command are described. Two examples are provided for the purposes of illustration. In a first example, the GPEM 202 can be configured to determine that an error condition is correctable by a power-cycling and in response request an authorization to implement the power-cycling command. In a second example, a power cycling request can be initiated from a remote device. For instance, a user of the remote device can notice a gaming machine is out of order and send a command to a GPEM coupled to the gaming machine that can possibly fix the error condition. One or more of the methods described above, such as but limited to verifying an identity of a remote device, verifying an identity of a user or determining the remote device is physically located proximate to the GPEM, can be utilized during the implementation of these examples.

Although certain tasks are shown being performed by certain devices in FIG. 9, in alternate embodiments, some of the tasks can be moved from one device to another or can be eliminated. For instance, in one embodiment, the GPEM 202 can gather information associated with an error condition and forward it the server 101, which can determine whether to initiate a power cycling on the device to fix the error condition. In another example, the system 300 can be configured to allow the GPEM 202 to communicate directly with the remote device 302 without going through the server 101. In this embodiment, the server 101 may not be utilized in the communication path between the GPEM 202 and the remote device 302 during certain communications between the GPEM 202 and the remote device 302.

In 304, the GPEM 202 can be configured to determine an error condition can be corrected from an implementation of a power-cycling event on a gaming machine. For instance, the GPEM 202 can receive status information from a bill validator or ticket acceptor that indicates an error condition has occurred and determine that it can be corrected by cycling power to the bill validator. In 306, the GPEM can send a message including information describing the error condition and requesting an authorization to implement a power cycling. The GPEM 202 can be connected to many other different types of devices, such as but not limited to coin acceptors, card readers, coin hoppers, signs, reels, wheels and other types of electro-mechanical devices that can be utilized in a gaming environment.

In one embodiment, the server 101 can be configured to autonomously authorize the power cycling and send a message to the GPEM indicating the request has been authorized. In another embodiment, the server 101 can be configured to route the message to a remote device 302. The remote device 302 can be controlled by a user that is allowed to authorize a power cycling event. If it is required that the remote device 302 be in proximity to the GPEM 202 when the power cycling event is carried out and multiple remote devices are currently being carried by users that can be used for this task, then the server 101 can be configured to determine which user is best suited to carry out the task. For instance, the server 101 can be configured to send information to the remote device of a user that is currently closet to the GPEM that has requested authorization for the power cycling. The server 101 or another device in the system 300 can be configured to determine whether a task has been carried out, such as whether a remote device has been brought into proximity to the GPEM to carry out the power cycling, and also notify other users if the task is not carried out within a certain time period.

In 308, the remote device can process the request. The processing of the request may involve alerting a user of the request and outputting information to a display screen the remote device. This information that is output can include but is not limited to 1) identifying the gaming device that is affected by the request, such as its serial number and/or location in a bank of gaming machine, 2) a description of the error condition, 3) a recent maintenance history associated device and 4) a request to enter information that allows the request to be carried out, such as user identification information. In 310, the remote device 310 can send a message authorizing the request to the GPEM 202. The authorization request 310 can be routed through the server 101.

In 312, the GPEM 202 can begin power cycling. The power cycling can involve determining a status of the gaming machine, such as whether it is idle or not based on information received from a game controller. Further, detection devices on the GPEM 202 can be used to determine a status of the gaming device. For instance, captured image data can be used to determine whether there are any players proximate to the gaming machine. When the gaming machine is determined to be idle, i.e., not currently in use by a player, then the power cycling can begin. The power cycling can involve the GPEM 202 sending a signal to a switch (see e.g., FIGS. 4A and 4B) and interrupting power to one or more devices on the gaming machine.

In 314, the GPEM 202 can determine a status of the gaming machine after the power cycling, such as whether the error condition appears to be cleared or not and whether the gaming machine is currently available for game play. In 316, the status can be reported to the server 101 and/or the remote device 302. In 318, the remote device 302 can process the status, such as outputting information indicating the power cycling has been completed and the current status of the gaming machine, such as whether it is available for gaming or still exhibiting and error condition. The server 101 and/or the remote device 302 can log information about the power cycling event, such as the device and/or person that authorized the event, the time, the error condition and the status of the device after the power cycling.

In another embodiment, the remote device 302 can generate a request for power cycling 320. For instance, an operator can notice that a gaming device on a casino floor is in an error state. Using a mobile device, the operator can identify the gaming device, possible learn about its status, such as the error condition and when it occurred, and then generate a request to implement a power cycle on the device. In 322, the request can be sent directly to the GPEM 202 or routed through a server 101 to the GPEM 202. The server 101 and/or the GPEM 202 can log information about the request. In one embodiment, in 324, the server can authorize the request and then in 326 send the authorized power cycling request to the GPEM 202. Then, the GPEM 202 can implement the power cycling, determine its status and report the status in 312, 314 and 316 as described above.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A gaming machine comprising:

a cabinet including a secure enclosure;

an AC power source, disposed within the secure enclosure, configured to provide power to the gaming machine;

a game controller, disposed within the secure enclosure, for controlling a wager-based game played on the gaming machine, communicatively coupled to a plurality of peripheral devices;

a manual switch, disposed within the secure enclosure, and coupled to the AC power source wherein the manual switch is configured to interrupt or allow power to the gaming machine including the game controller and the plurality of peripheral devices and wherein after the gaming machine is operational for wager-based game play, access to the manual switch requires unlocking the secure enclosure;

a power switching device, disposed within the secure enclosure and retrofitted to the gaming machine, configured to receive AC power from the AC power source and to output AC power including 1) a switch configured to change positions such that received AC power is transmitted or blocked from being output to the gaming machine including the game controller and the plurality of peripheral devices and 2) control circuitry configured to receive a control signal from a controller in a gaming platform enhancement module and in response to the control signal generate a second signal to open the switch and block the AC power from being output wherein the switch is configured to default to a closed position allowing AC power to be transmitted in the absence of the second signal;

the gaming platform enhancement module (GPEM), said GPEM retrofitted to the gaming machine such that it can receive AC power from the from AC power source when the switch is open and the power is interrupted to the game controller and the plurality of peripheral devices, including:

a first communication interface for receiving information from the game controller;

a second communication interface for wirelessly communicating with one or remote devices;

a third communication interface for sending the control signal to change a position of the switch via the one or more control inputs;

the controller, including a processor and a memory, separate from the game controller and the circuitry in the power switching device, configured to 1) receive information related to a status of the gaming machine via the first communication interface from the game controller, 2) wirelessly communicate with the one or more remote devices via the second communication interface and 3) send the control signal to the circuitry in the power switching device via the third communication interface to cycle the AC power for the gaming machine including the game controller and plurality of peripheral devices while the secure enclosure is locked wherein the GPEM is configured to remain operational while the power is cycled to the gaming machine.

2. The gaming machine of claim 1, wherein the switch is controlled using a DC control signal.

3. The gaming machine of claim 1, further comprising an opti-isolator circuit disposed between the power circuitry associated with the switch and the control circuitry to prevent electric discharge from the power switching device from entering the GPEM.

4. The gaming machine of claim 1, wherein the power switching device includes a plurality of switches wherein the position of each switch is separately controlled by the control circuitry.

5. The gaming machine of claim 1, wherein the power switching device is configured to provide switchable and non-switchable power.

6. The gaming machine of claim 1, wherein the GPEM and the power switching device are provided as an integrated unit.

7. The gaming machine of claim 1, wherein the controller is further configured to detect an error condition on the gaming machine wherein the control signal is sent to the power switching device to interrupt power to clear the error condition.

8. The gaming machine of claim 7, wherein the controller is further configured to request an authorization from a remote device prior to sending the control signal to the power switching device to interrupt power.

9. The gaming machine of claim 1 wherein the controller is further designed or configured to receive a command, via the wireless interface, from a remote device to generate the control signal to the power switching device to cycle power for the gaming machine.

10. The gaming machine of claim 1, wherein the controller, based upon the information received from the game controller, is further configured to determine whether the gaming machine is in a state that allows the gaming machine to be power cycled.

11. The gaming machine of claim 10, wherein the state is a malfunctioning state or an idle state where the gaming machine is available for game play.

12. A method in a gaming machine having 1) a cabinet including a secure enclosure; 2) an AC power source, disposed within the secure enclosure, configured to provide power to the gaming machine; 3) a game controller, disposed within the secure enclosure, for controlling a wager-based game played on the gaming machine, communicatively coupled to a plurality of peripheral devices coupled to the cabinet and 4) a manual switch, disposed within the secure enclosure and coupled to the AC power source, wherein the manual switch is configured to interrupt or allow AC power to the gaming machine including the game controller and the plurality of peripheral devices, the method comprising:

receiving in a Gaming Platform Enhancement Module (GPEM), added to the gaming machine during a retrofit, a command from a remote device outside of the gaming machine to cycle power to the gaming machine including cycling power to the game controller and the plurality of peripheral devices wherein the GPEM includes a processor and a memory separate from the game controller and circuitry within a power switching device wherein the command is received via a wireless interface associated with the GPEM added during the retrofit;

receiving in the GPEM via a communication pathway added during the retrofit, information from the game controller;

based upon the information received from the game controller, determining in the GPEM whether the gaming machine, which provides a wager-based game, is in a state that allows a power interruption; and while the secure enclosure is locked such that the manual switch is inaccessible for cycling the power, sending from the GPEM a control signal to the circuitry in the power switching device added during the retrofit that is disposed within the secure enclosure wherein in response to receiving the control signal from the GPEM, the circuitry generates a second signal to change a switch position such that the AC power is interrupted to the game controller and the plurality of peripheral devices wherein the GPEM is coupled to the AC power during the retrofit such that it can remain powered and operational while the AC power is cycled to the game controller.

13. The method of claim 12, further comprising: determining in the GPEM an error condition has occurred on the gaming machine and sending a message to the remote device including information related to the error condition on the gaming machine via the wireless interface added during the retrofit.

14. The method of claim 12, wherein the one or more gaming devices is a game controller.

15. The method of claim 12, further comprising: receiving in the GPEM via one or more devices coupled to the GPEM data indicating a proximity of the remote device to the GPEM.

16. The method of claim 12, wherein the GPEM is configured to only command the power switching device to interrupt power to the game controller and the plurality of peripheral devices when the remote device is within some distance of the GPEM.

17. A method in a gaming machine having 1) a cabinet including a secure enclosure; 2) an AC power source, disposed within the secure enclosure, configured to provide power to the gaming machine; 3) a game controller, disposed within the secure enclosure, for controlling a wager-based game played on the gaming machine, communicatively coupled to a plurality of peripheral devices coupled to the cabinet and 4) a manual switch, disposed within the secure enclosure and coupled to the AC power source, wherein the manual switch is configured to interrupt or allow AC power to the gaming machine including the game controller and the plurality of peripheral devices, the method comprising:

receiving in Gaming Platform Enhancement Module (GPEM) via a communication pathway, information from the game controller or one or more of the plurality of peripheral devices wherein the GPEM and the communication pathway are added during a retrofit of the gaming machine and wherein the GPEM includes a processor and a memory separate from the game controller and circuitry within a power switching device;

based upon the received information, determining in the GPEM that an error condition has occurred on the gaming machine;

determining in the GPEM that cycling power on the gaming machine can clear the error condition;

based upon the received information, determining in the GPEM whether the gaming machine, which is configured to provide a wager-based game, is in a state that allows for power cycling; and while the secure enclosure is locked such that the manual switch is inaccessible for cycling the power, sending from the GPEM a control signal to the circuitry in the power switching device added during the retrofit and disposed within the secure enclosure wherein in response to receiving the control signal, the circuitry in the power switching device generates a second signal to change a switch position such that the AC power is cycled to the game controller and the plurality of peripheral devices on the gaming machine wherein the GPEM is coupled to the AC power during the retrofit such that it can remain powered and operational while the AC power is cycled to the game controller.

18. The method of claim 17, further comprising: prior to cycling power on the gaming machine, sending a request to authorize the power cycling to a remote device via a wireless interface coupled to the GPEM and added during the retrofit.

19. The method of claim 18, wherein the request includes information regarding a location of the gaming machine and the error condition.

20. The method of claim 17, further comprising: determining, after the power cycling is completed, whether the error condition is cleared.

* * * * *